United States Patent
Guo et al.

(10) Patent No.: US 10,708,960 B2
(45) Date of Patent: Jul. 7, 2020

(54) METHOD FOR ESTABLISHING COMMUNICATION CONNECTION BETWEEN STATION AND ACCESS POINT, ACCESS POINT, AND STATION

(71) Applicant: Huawei Technologies Co., Ltd., Shenzhen (CN)

(72) Inventors: Yuchen Guo, Shenzhen (CN); Xun Yang, Shenzhen (CN); Peter Loc, Cupertino, CA (US); Meilu Lin, Shenzhen (CN); Yanchun Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 15/627,048

(22) Filed: Jun. 19, 2017

(65) Prior Publication Data

US 2017/0290076 A1    Oct. 5, 2017

Related U.S. Application Data

(63) Continuation of application No. PCT/CN2015/098996, filed on Dec. 25, 2015.

(30) Foreign Application Priority Data

Dec. 31, 2014    (CN) .......................... 2014 1 0856430

(51) Int. Cl.
*H04W 76/11* (2018.01)
*H04L 29/06* (2006.01)
(Continued)

(52) U.S. Cl.
CPC ........... *H04W 76/11* (2018.02); *H04L 63/083* (2013.01); *H04W 12/06* (2013.01); *H04W 28/06* (2013.01);
(Continued)

(58) Field of Classification Search
CPC . H04W 76/11; H04W 74/0816; H04W 12/06; H04W 28/06; H04W 84/12; H04L 63/083
See application file for complete search history.

(56) References Cited

U.S. PATENT DOCUMENTS

2008/0146253 A1    6/2008    Wentink
2011/0235593 A1    9/2011    Gong et al.
(Continued)

FOREIGN PATENT DOCUMENTS

CN    101124777 A    2/2008
CN    102412944 A    4/2012
(Continued)

*Primary Examiner* — Will W Lin
(74) *Attorney, Agent, or Firm* — Slater Matsil, LLP

(57) ABSTRACT

A method for establishing a communication connection between a station (STA) and an access point (AP). The method includes: receiving, by the AP, request frames sent by N STAs to the AP, and after the AP receives the request frames sent by the N STAs, contending for a channel by the AP and sending one response frame to M STAs, where the response frame includes identifiers of the M STAs and M responses to the M STAs. Each of the identifiers of the M STAs corresponds to one of the M responses, wherein $2 \leq M \leq N$.

34 Claims, 13 Drawing Sheets

(51) Int. Cl.
*H04W 28/06* (2009.01)
*H04W 12/06* (2009.01)
*H04W 74/08* (2009.01)
*H04W 84/12* (2009.01)

(52) U.S. Cl.
CPC ........ *H04W 74/0816* (2013.01); *H04W 84/12* (2013.01)

(56) References Cited

U.S. PATENT DOCUMENTS

| | | | |
|---|---|---|---|
| 2012/0230242 A1 | 9/2012 | Kim et al. | |
| 2013/0294354 A1* | 11/2013 | Zhang | H04W 72/04 370/329 |
| 2013/0301569 A1 | 11/2013 | Wang et al. | |
| 2013/0301625 A1 | 11/2013 | Thoukydides et al. | |
| 2014/0146809 A1 | 5/2014 | Xing et al. | |
| 2014/0198723 A1* | 7/2014 | Gong | H04W 74/006 370/328 |
| 2015/0030036 A1* | 1/2015 | Wang | H04L 69/04 370/477 |
| 2015/0173014 A1* | 6/2015 | Lee | H04W 52/0216 370/311 |
| 2016/0088665 A1* | 3/2016 | Kim | H04W 74/008 370/329 |
| 2016/0183162 A1* | 6/2016 | Jeong | H04W 40/22 370/311 |
| 2016/0183189 A1* | 6/2016 | Merlin | H04W 52/0219 370/311 |
| 2016/0183243 A1* | 6/2016 | Park | H04W 72/0413 370/329 |

FOREIGN PATENT DOCUMENTS

| | | |
|---|---|---|
| CN | 102771059 A | 11/2012 |
| CN | 103095429 A | 5/2013 |
| EP | 2506450 A2 | 10/2012 |
| GB | 2501964 A | 11/2013 |
| WO | 2013064113 A1 | 5/2013 |

\* cited by examiner

US 10,708,960 B2

METHOD FOR ESTABLISHING COMMUNICATION CONNECTION BETWEEN STATION AND ACCESS POINT, ACCESS POINT, AND STATION

CROSS-REFERENCE TO RELATED APPLICATIONS

This application is a continuation of International Application No. PCT/CN2015/098996, filed on Dec. 25, 2015, which claims priority to Chinese Patent Application No. 201410856430.3, filed on Dec. 31, 2014. The disclosures of the aforementioned applications are hereby incorporated by reference in their entireties.

TECHNICAL FIELD

Embodiments of the present invention relate to the field of communications technologies, and more specifically, to a method for establishing a communication connection between a station (STA) and an access point (AP).

BACKGROUND

In an existing Wireless Fidelity (WiFi) system, a premise of data communication between a STA and an AP is that the STA is already associated with the AP. Before the association, identity of the STA needs to be verified by the AP first, and the identity verification process may also be referred to as an authentication process. After the authentication is complete, the STA initiates the association process between the STA and the AP, and if the association succeeds, the STA may perform data communication with the AP.

However, in the existing WiFi system, all authentication processes or association processes between multiple STAs and an AP are relatively independent, that is, each of the different STAs contends for a channel and sends an authentication frame or an association request frame of the STA. After receiving the authentication frames or the association request frames, the AP sends a separate corresponding response to each STA, and these responses occupy relatively more downlink resources.

SUMMARY

In view of this, embodiments of the present invention provides an access point, a STA, and a method for establishing a communication connection between the STA and the AP, so as to resolve a problem that relatively more downlink resources are occupied in the prior art.

According to a first aspect, an embodiment of the present invention provides an AP, where the AP includes a processor (122), a memory (124), and a radio interface (126). The memory (124) is configured to store instructions. The radio interface (126) is configured to connect the AP and N STAs, where N is a natural number greater than or equal to 1. The processor (122) is coupled to the memory (124), and is configured to read and execute the instructions in the memory (124). The instructions include receiving, by using the radio interface (126), N request frames sent by the N STAs, contending for a channel and sending, by using the radio interface (126), one response frame to M STAs of the N STAs on the channel after successful contention. The response frame includes identifiers of the M STAs and M responses to the M STAs. Each of the identifiers of the M STAs corresponds to one of the M responses, and the M identifiers and the M responses are used to instruct the M STAs to receive respective responses from the response frame sent by the AP. M is a natural number less than or equal to N.

In an embodiment, when the foregoing AP needs to send the M responses in one response frame, $2 \leq M \leq N$, and $N \geq 2$.

When the foregoing AP needs to send data frames or management frames of J other STAs than the N STAs together with the foregoing M responses, a value of M may be 1 or a number greater than 1, that is, $1 \leq M \leq N$, and $N \geq 1$.

In an embodiment, the identifiers of the foregoing STAs may be PMAs that are generated by the processor (122) according to MAC addresses of the M STAs, where the MAC addresses of the M STAs are stored in the memory (124).

In another embodiment, the identifier of the STA may be a temporary AID, and the temporary AID is a sequence randomly selected by each STA from a preset sequence range, and is carried in the request frame and sent to the AP. Alternatively, the temporary AID is generated by the processor (122), and is sent to each STA by using an acknowledgment frame before the response frame is sent.

Optionally, the foregoing preset sequence range may further be determined by the processor (122) and sent to each STA by using the radio interface.

A value of N may be determined in multiple manners. In an embodiment, N may refer to a quantity of STAs that send request frames to the AP in a time range. For example, the AP may further include a timer (128) that is configured to set a time range. The processor (122) is further configured to receive, by using the radio interface (126) in the time range that is set by the timer (128), the request frames sent by the STAs, where N refers to a quantity of STAs that send request frames to the AP in the time range.

In another embodiment, a value of N may be determined by the processor (122), and the value of N is a maximum quantity of users that can be supported by a downlink Orthogonal Frequency Division Multiple Access (OFDMA) frame, a downlink MU MIMO frame, or a downlink multicast frame. Alternatively, the value of N is a quantity of connected STAs that is preferably supported by the AP.

To enable the foregoing M STAs to know that the AP is to subsequently send responses with respect to the M STAs in a downlink OFDMA manner, or a downlink MU MIMO manner, or a downlink multicast frame manner, before sending the response frame, the processor (122) of the AP may send an acknowledgment frame to each STA by using the radio interface (126). The acknowledgment frame includes indication information, and the indication information is used to notify each STA that the AP is to send the responses with respect to the M STAs in a downlink OFDMA manner, or a downlink MU MIMO manner, or a downlink multicast frame manner. The downlink OFDMA manner is used as an example. After receiving the request frames sent by the N STAs, the processor (122) of the AP contends for a channel, and sends the responses with respect to the foregoing M STAs on different sub-bands of the channel after successful contention. To further save downlink resources, the foregoing processor (122) of the AP may further send data frames or management frames of other STAs together with the responses with respect to the foregoing M STAs in the response fame. For example, J STAs of K STAs that are waiting to receive data frames or management frames from the AP support the downlink OFDMA manner, or the MU MIMO manner, or the multicast frame manner, and the foregoing response frame sent by the AP further includes data frames or management frames of the J STAs and identifiers of the J STAs, so that each STA of the J STAs matches an identifier stored by the STA against the identifiers of the J STAs in the response frame, so as to receive, from the response frame, a data frame or a management frame with respect to the STA, and J is a natural number greater than or equal to 1.

Because all the foregoing M STAs support the uplink OFDMA manner or the MU MIMO manner, to further save uplink resources, the AP may also require the foregoing M STAs to subsequently send the request frames of the M STAs on M sub-bands or M spatial flows of a same uplink channel. For example, the processor (122) delivers trigger signaling by using the radio interface (126), the trigger signaling is used to instruct the M STAs to send M other request frames of the M STAs on M sub-bands or M spatial flows of a same uplink channel.

In addition, the foregoing trigger signaling may be further used to instruct J other STAs to send data frames, scheduling request frames, management frames, or status information of buffers of the J STAs on J other sub-bands or J other spatial flows of the same uplink channel.

According to a second aspect, an embodiment of the present invention provides a STA, where the STA includes a processor (112), a memory (114), and a radio interface (116), where the memory (114) is configured to store instructions. The radio interface (116) is configured to connect the STA and an access point (AP). The processor (112) is coupled to the memory (114), and is configured to read and execute the instructions in the memory (114). The instructions include sending a request frame to the AP by using the radio interface (116), and receiving a response frame sent by the AP, where the response frame includes identifiers of M STAs and M responses to the M STAs. Each of the identifiers of the M STAs corresponds to one of the M responses, where M is a natural number greater than or equal to 1. The instructions also include obtaining an identifier of the STA, and matching the obtained identifier of the STA against the identifiers of the M STAs in the response frame, so as to obtain a response with respect to the STA from the M responses.

The foregoing STA provided in an embodiment of the present invention is one of the M STAs. In a possible implementation manner, when the foregoing AP needs to send the M responses in one response frame, $2 \leq M \leq N$, and $N \geq 2$.

When the foregoing AP needs to send data frames or management frames of J other STAs than the N STAs together with the foregoing M responses, the foregoing response frame may further include identifiers of J other STAs and the data frames or the management frames of the J STAs. In this case, a value of M may be 1 or a number greater than 1, that is, $1 \leq M \leq N$, and $N \geq 1$.

In an embodiment, the memory (114) is further configured to store a MAC address of the STA, and the processor (112) is further configured to generate the identifier of the STA according to the MAC address of the STA that is stored in the memory (114).

When the identifier of the STA is not obtained by the STA by interacting with the AP, to enable the identifier of the STA to match an identifier generated by the AP, the STA and the AP may use a same algorithm or formula to generate the identifier of the STA. For example, both the STA and the AP may generate a PMA by using a manner described in the specification, and use the generated PMA as the identifier of the STA. After receiving the identifiers of the M STAs that are sent by the AP, the STA may match the identifier of the STA that is generated by the STA against the identifiers of the M STAs in the response frame that is sent by the AP, so as to obtain a response with respect to the STA.

In another embodiment, the identifier of the STA may be a temporary AID. The processor (112) is further configured to randomly select, from a preset sequence range, a sequence as the temporary AID, and the temporary AID is carried in the request frame and sent to the AP. Alternatively, the processor (112) is further configured to receive, by using the radio interface (116) before receiving the response frame, an acknowledgment frame sent by the AP, where the acknowledgment frame includes the temporary AID.

Optionally, the foregoing preset sequence range may be determined by the AP, and therefore the processor (112) may be further configured to receive, by using the radio interface (116), the preset sequence range sent by the AP.

In an embodiment, N STAs may send request frames to the AP. The M STAs are some or all of the N STAs, wherein M is less than or equal to N, and N is a natural number greater than or equal to 1.

Optionally, N refers to a quantity of STAs that send authentication frames to the AP in a preset time range.

Alternatively, N may be determined by the AP, and a value of N is a maximum quantity of users that can be supported by a downlink OFDMA frame, or a downlink MU MIMO frame, or a downlink multicast frame. Alternatively, a value of N is a quantity of connected STAs that can be supported by the AP.

Optionally, the processor (112) is further configured to, before receiving the response frame sent by the AP, receive an acknowledgment frame sent by the AP, where the acknowledgment frame includes indication information. The processor (112) is further configured to learn, according to the indication information, that the AP is to send the responses with respect to the M STAs by using the response frame.

Optionally, the response frame further includes data frames or management frames of J other STAs and identifiers of the J STAs, so that each STA of the J STAs matches an identifier stored by the STA against the identifiers of the J STAs, so as to receive, from the response frame, a data frame or a management frame with respect to the STA.

Optionally, the processor (112) is further configured to receive trigger signaling sent by the AP by using the radio interface (116), and the trigger signaling is used to instruct the M STAs to send M other request frames of the M STAs on M sub-bands or M spatial flows of a same uplink channel.

Optionally, the processor (112) is further configured to: after sending the request frame to the AP, receive a multi-user acknowledgment frame sent by the AP, and the multi-user acknowledgment frame includes acknowledgments to the M STAs.

Optionally, the trigger signaling is further used to instruct J other STAs to send data frames, scheduling request frames, management frames, or status information of buffers of the J STAs on J other sub-bands or J other spatial flows of the same uplink channel.

According to a third aspect, an embodiment of the present invention provides a method for establishing a communication connection between a STA and an AP. The method includes receiving, by the AP, request frames sent by N STAs to the AP, where N is a natural number greater than or equal to 1. The method further includes contending for a channel by the AP after receiving the request frames sent by the N STAs, and sending one response frame to M STAs of the N STAs on the channel after successful contention. The response frame includes identifiers of the M STAs and M responses to the M STAs. Each of the identifiers of the M STAs corresponds to one of the M responses and are used to instruct the M STAs to receive respective responses from the response frame sent by the AP, and M is a natural number less than or equal to N.

Optionally, the identifiers of the M STAs are respectively generated by the AP according to MAC addresses of the M STAs.

Optionally, the identifier of the STA is a temporary AID, and the temporary AID is a sequence randomly selected by each STA from a preset sequence range, and is carried in the request frame and sent to the AP. Alternatively, the temporary AID is generated by the AP, and is sent to each STA by using an acknowledgment frame before the response frame is sent.

Optionally, the preset sequence range is determined by the AP and sent to each STA.

Optionally, the receiving, by the AP, request frames sent by N STAs to the AP includes setting a time range by the AP. It also includes receiving, by the AP in the time range, the request frames sent by the STAs, where N refers to a quantity of STAs that send request frames to the AP in the time range.

Optionally, N is determined by the AP, and a value of N is a maximum quantity of users that can be supported by a downlink OFDMA frame, or a downlink MU MIMO frame, or a downlink multicast frame. Alternatively a value of N is a quantity of connected STAs that is preferably supported by the AP.

Optionally, before sending the one response frame to the M STAs, the AP sends an acknowledgment frame to each STA, where the acknowledgment frame includes indication information, and the indication information is used to notify each STA that the AP is to send the responses with respect to the M STAs by using the one response frame.

Optionally, the response frame sent by the AP further includes data frames or management frames of J other STAs and identifiers of the J STAs, so that each STA of the J STAs matches an identifier stored by the STA against the identifiers of the J STAs, so as to receive, from the response frame, a data frame or a management frame with respect to the STA.

Optionally, the AP delivers trigger signaling, the trigger signaling is used to instruct the M STAs to send M other request frames of the M STAs on M sub-bands or M spatial flows of a same uplink channel.

Optionally, after receiving the N request frames, the AP sends a multi-user acknowledgment frame to the M STAs, and the multi-user acknowledgment frame includes acknowledgments to the M STAs.

Optionally, the trigger signaling is further used to instruct J other STAs to send data frames, scheduling request frames, management frames, or status information of buffers of the J STAs on J other sub-bands or J other spatial flows of the same uplink channel.

According to a fourth aspect, an embodiment of the present invention provides a method for establishing a communication connection between a STA and an AP. The method includes sending, by the STA, a request frame to the AP and receiving, by the STA, a response frame sent by the AP, where the response frame includes identifiers of M STAs and M responses to the M STAs. Each of the identifiers of the M STAs corresponds to one of the M responses, and M is a natural number greater than or equal to 1. The method also includes matching, by the STA, an identifier stored by the STA against the identifiers of the M STAs, so as to obtain a response with respect to the STA from the M responses.

Optionally, the identifiers of the M STAs are respectively generated by the AP according to MAC addresses of the M STAs, and the identifier stored by the STA is generated by the STA according to a MAC address of the STA.

Optionally, the identifiers of the M STAs are M temporary AIDs, and the temporary AID is a sequence randomly selected by each STA from a preset sequence range, and is carried in the request frame and sent to the AP. Alternatively, the temporary AID is generated by the AP and is sent to each STA by using an acknowledgment frame before the response frame is sent.

Optionally, the preset sequence range is determined by the AP and sent to the STA.

Optionally, N STAs send request frames to the AP, the M STAs are some or all of the N STAs, M is less than or equal to N, and N is a natural number greater than or equal to 1.

Optionally, N refers to a quantity of STAs that send authentication frames to the AP in a preset time range.

Optionally, N is determined by the AP, and a value of N is a maximum quantity of users that can be supported by a downlink OFDMA frame, or a downlink MU MIMO frame, or a downlink multicast frame. Alternatively, a value of N is a quantity of connected STAs that can be supported by the AP.

Optionally, before receiving the response frame sent by the AP, the STA receives an acknowledgment frame sent by the AP, where the acknowledgment frame includes indication information, and the STA learns, according to the indication information, that the AP is to send the responses with respect to the M STAs by using the response frame.

Optionally, the response frame further includes data frames or management frames of J STAs and identifiers of the J STAs, so that each STA of the J STAs matches an identifier stored by the STA against the identifiers of the J STAs, so as to receive, from the response frame, a data frame or a management frame with respect to the STA.

Optionally, the STA receives trigger signaling sent by the AP, and the trigger signaling is used to instruct the M STAs to send M other request frames of the M STAs on M sub-bands or M spatial flows of a same uplink channel.

Optionally, after sending the request frame to the AP, the STA receives a multi-user acknowledgment frame sent by the AP, and the multi-user acknowledgment frame includes acknowledgments to the M STAs.

Optionally, the trigger signaling is further used to instruct J other STAs to send data frames, scheduling request frames, management frames, or status information of buffers of the J STAs on J other sub-bands or J other spatial flows of the same uplink channel.

According to a fifth aspect, an embodiment of the present invention provides an AP, where the AP includes a processor (122), a memory (124), and a radio interface (126). The memory (124) is configured to store instructions (1141). The radio interface (126) is configured to connect the AP and N STAs, and N is a natural number greater than or equal to 1. The processor (122) is coupled to the memory (124) and is configured to read and execute the instructions (1141) in the memory (124). The instructions include receiving, by using the radio interface (126), N request frames sent by the N STAs, contending for a channel and sending, by using the radio interface (126), one response frame to M STAs of the N STAs on the channel after successful contention. The response frame includes identifiers of the M STAs and M responses to the M STAs. Each of the identifiers of the M STAs corresponds to one of the M responses and are used to instruct the M STAs to receive respective responses from the response frame sent by the AP, and M is a natural number less than or equal to N.

The response frame further includes data frames or management frames of J other STAs and identifiers of the J STAs, so that each STA of the J STAs matches an identifier stored by the STA against the identifiers of the J STAs, so as to receive, from the response frame, a data frame or a management frame with respect to the STA, and J is a natural number greater than or equal to 1.

Optionally, the processor (122) is further configured to deliver trigger signaling by using the radio interface (126), and the trigger signaling is used to instruct the M STAs to send M other request frames of the M STAs on M sub-bands or M spatial flows of a same uplink channel.

Optionally, the trigger signaling is further used to instruct J other STAs to send data frames, scheduling request frames, management frames, or status information of buffers of the J STAs on J other sub-bands or J other spatial flows of the same uplink channel.

Some or all of the functions of the processor (122), the memory (124), and the radio interface (126) that are mentioned in the foregoing first aspect are also applicable to the fifth aspect.

According to a sixth aspect, an embodiment of the present invention provides a STA. In the sixth aspect, a response frame received by the STA from an AP not only includes a response that is sent to the STA, but also includes a response that is sent to another STA. The STA includes a processor (112), a memory (114), and a radio interface (116), where the memory (114) is configured to store instructions. The radio interface (116) is configured to connect the STA and the access point (AP). The processor (112) is coupled to the memory (114), and is configured to read and execute the instructions in the memory (114). The instructions include sending a request frame to the AP by using the radio interface (116), and receiving a response frame sent by the AP, where the response frame includes identifiers of M STAs and M responses to the M STAs. Each of the identifiers of the M STAs corresponds to one of the M responses, where M is a natural number greater than or equal to 1. The instructions also include obtaining an identifier of the STA and matching the obtained identifier of the STA against the identifiers of the M STAs in the response frame, so as to obtain a response with respect to the STA from the M responses.

The response frame further includes data frames or management frames of J other STAs and identifiers of the J STAs, so that each STA of the J STAs matches an identifier stored by the STA against the identifiers of the J STAs, so as to receive, from the response frame, a data frame or a management frame with respect to the STA.

Optionally, the processor (112) is further configured to receive trigger signaling sent by the AP by using the radio interface (116), and the trigger signaling is used to instruct the M STAs to send M other request frames of the M STAs on M sub-bands or M spatial flows of a same uplink channel.

Optionally, the trigger signaling is further used to instruct J other STAs to send data frames, scheduling request frames, management frames, or status information of buffers of the J STAs on J other sub-bands or J other spatial flows of the same uplink channel.

A person skilled in the art may understand that some or all of the functions of the processor (112), the memory (114), and the radio interface (116) that are mentioned in the foregoing second aspect are also applicable to the sixth aspect.

According to a seventh aspect, an embodiment of the present invention provides a method for establishing a communication connection between a STA and an AP. The method includes receiving, by the AP, request frames sent by N STAs to the AP, where N is a natural number greater than or equal to 1. The method also includes contending for a channel by the AP after receiving the request frames sent by the N STAs, and sending one response frame to M STAs of the N STAs on the channel after successful contention. The response frame includes identifiers of the M STAs and M responses to the M STAs. Each of the identifiers of the M STAs corresponds to one of the M responses, and the M identifiers and the M responses are used to instruct the M STAs to receive respective responses from the response frame sent by the AP, and M is a natural number less than or equal to N.

The response frame sent by the AP further includes data frames or management frames of J other STAs and identifiers of the J STAs, so that each STA of the J STAs matches an identifier stored by the STA against the identifiers of the J STAs, so as to receive, from the response frame, a data frame or a management frame with respect to the STA.

In an embodiment of the seventh aspect, the AP may further deliver trigger signaling, the trigger signaling is used to instruct the M STAs to send M other request frames of the M STAs on M sub-bands or M spatial flows of a same uplink channel.

Optionally, the trigger signaling is further used to instruct J other STAs to send data frames, scheduling request frames, management frames, or status information of buffers of the J STAs on J other sub-bands or J other spatial flows of the same uplink channel.

A person skilled in the art may understand that a part or all of the content mentioned in the foregoing third aspect is also applicable to the seventh aspect.

According to an eighth aspect, an embodiment of the present invention provides a method for establishing a communication connection between a STA and an AP. The method includes sending, by the STA, a request frame to the AP and receiving, by the STA, a response frame sent by the AP, where the response frame includes identifiers of M STAs and M responses to the M STAs. Each of the identifiers of the M STAs corresponds to one of the M responses, and M is a natural number greater than or equal to 1. The method also includes matching, by the STA, an identifier stored by the STA against the identifiers of the M STAs, so as to obtain a response with respect to the STA from the M responses.

The response frame further includes data frames or management frames of J STAs and identifiers of the J STAs, so that each STA of the J STAs matches an identifier stored by the STA against the identifiers of the J STAs, so as to receive, from the response frame, a data frame or a management frame with respect to the STA.

In a possible implementation manner of the eighth aspect, the STA receives trigger signaling sent by the AP, and the trigger signaling is used to instruct the M STAs to send M other request frames of the M STAs on M sub-bands or M spatial flows of a same uplink channel.

Optionally, the trigger signaling is further used to instruct J other STAs to send data frames, scheduling request frames, management frames, or status information of buffers of the J STAs on J other sub-bands or J other spatial flows of the same uplink channel.

A person skilled in the art may understand that a part or all of the content mentioned in the foregoing fourth aspect is also applicable to the eighth aspect.

In any embodiment of any foregoing aspect, there may be N STAs that send the request frame to the AP. However, some STAs of the N STAs may fail to meet a condition, for example, do not support a response frame sent by the AP to be received in a downlink OFDMA manner, or have a conflict between selected identifiers. Consequently, the AP cannot send the response frame to these STAs. Therefore, although N authentication request frames are received by the AP, acknowledgment frames that are sent may include acknowledgments only to M STAs of the N STAs, and M is a natural number less than or equal to N. A person skilled in the art may understand that when all the STAs of the N STAs meet the condition, M=N.

In any embodiment of any foregoing aspect, the identifier of the STA may be a PMA, and the PMA may be generated according to the following formula:

$$PMA=(dec(MA[a:b])+dec(MA[c:d]\oplus MA[e:f])\times 2^g) \bmod(2^h-i)+j,$$

where a, b, c, d, e, f, g, h, i, and j are natural numbers, MA[m:n] refers to an $m^{th}$ LSB bit to an $n^{th}$ LSB bit of a MAC address of the STA, and dec refers to a decimal number. An AID range may not be involved in the generation solution, and relatively more bits of the MAC address are used, better avoiding an overlap of a PMA address.

In any embodiment of any foregoing aspect, the trigger signaling may be located in a response frame, or may be located in a trigger frame sent by the AP.

In any embodiment of any foregoing aspect, the request frame may be an authentication request frame and the response frame is an authentication response frame; or the foregoing request frame is an association request frame and the response frame is an association response frame. The foregoing authentication request frame and authentication response frame are merely two different names, and are used to distinguish a used authentication frame from an authentication frame that is not used. In a practical application, both of the two frames may be referred to as authentication frames, and a network entity that receives the authentication frames may make a distinction by using different sequence numbers carried in the authentication frames.

By using the STA, the AP, and the method that are provided above in the embodiments of the present invention, the AP may send a response for one STA together with a response with respect to another STA in one response frame, or the AP may send a response with respect to one STA together with a data frame or a management frame of another STA, thereby saving downlink resources. In addition, further, in a scenario of intensive users, an average delay for establishing a connection between a STA and an AP may be shortened.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that a STA in the embodiments of the present invention may be a wireless communications chip, a wireless sensor, or a wireless communications terminal. For example, a mobile phone that supports a WiFi communication function, a tablet computer that supports a WiFi communication function, a set top box that supports a WiFi communication function, a smart TV that supports a WiFi communication function, an intelligent wearable device that supports a WiFi communication function, and a computer that supports a WiFi communication function. Optionally, the STA may support an 802.11ax standard.

Further, optionally, the STA supports multiple WLAN standards such as 802.11ac, 802.11n, 802.11g, 802.11b, and 802.11a.

An AP may also be referred to as a wireless access point, a hotspot, or the like. The AP is a special station that may provide an access service for a station, and may be an access point for a mobile user to access a wired network. The AP is mainly deployed in a family, inside a building, and inside a park, and a typical coverage radius is tens of meters to hundreds of meters. Certainly, the AP may also be deployed outdoors. The AP is equivalent to a bridge connecting a wired network and a wireless network. A main function of the AP is to connect all wireless network clients together, and then connect the wireless network to an Ethernet network. At present, a standard mainly used by the AP is an Institute of Electrical and Electronics Engineers (IEEE) 802.11 series. Specifically, the AP may be a terminal device with a WiFi chip or a network device with a WiFi chip. Optionally, the AP may be a device that supports an 802.11ax standard. Further, optionally, the AP may be a device that supports multiple wireless local area network standards such as 802.11ac, 802.11n, 802.11g, 802.11b, and 802.11a.

The embodiments of the present invention may be applied to a wireless local area network, and the wireless local area network may be a basic service set (BSS) that includes an AP. It should be understood that in a basic network structure of a WiFi system, multiple BSSs may be included in a network, and each BSS may include one AP and multiple STAs that are associated with the AP. In the embodiments of the present invention, a station is used only as an example to make an exemplary description, which is not limited in the present invention.

Figure 1:
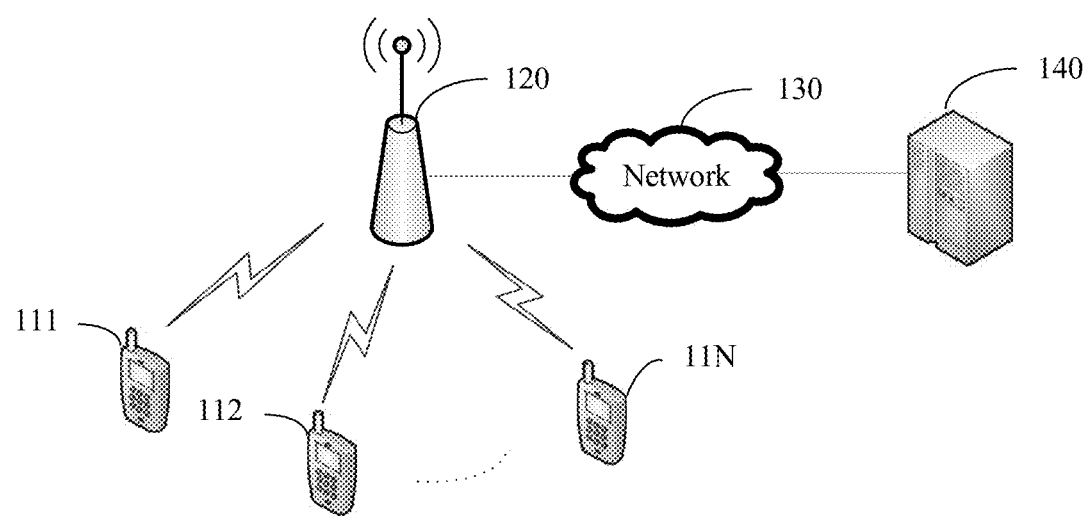
FIG. 1 is a schematic diagram of a WiFi system in the prior art.
Figure 2:
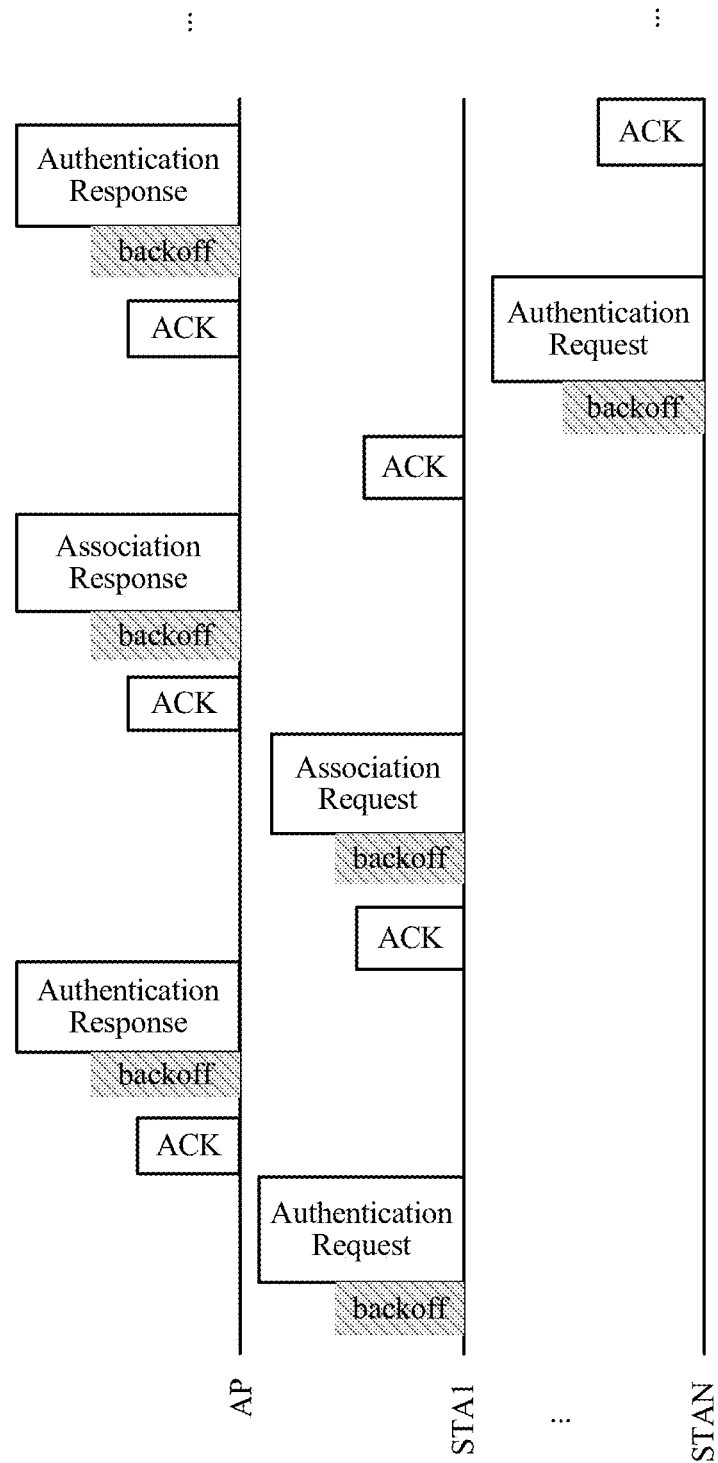
FIG. 2 is a schematic flowchart of signaling for establishing a connection between a STA and an AP in the prior art.

FIG. 1 is a schematic diagram of a WiFi system in the prior art. As shown in FIG. 1, in a WiFi system, one or more STAs (111, 112, . . . , 11N) may establish a connection to an AP (120), and only a STA that establishes a connection to the AP may perform data communication with a network device (140) by using the AP. A process for establishing a connection between a STA and an AP includes two processes: authentication and association. In the prior art, all processes for establishing connections between different STAs and an AP are relatively independent. For details, refer to FIG. 2. That is, each of different STAs (STA 1, . . . , STA N) contends for a channel and sends an authentication request (Authentication Request) frame on the channel after successful contention. After receiving the authentication request frame, the AP sends an acknowledgment (ACK) frame and an authentication response frame to each STA. There may be only one time of authentication between a STA and an AP, or there may be multiple times of authentication. After the authentication succeeds, the STAs send association request frames to the AP. After receiving the association request frames, the AP sends an acknowledgment (ACK) frame and an association response frame to each STA. After the association between the STAs and the AP succeeds, data communication may be performed between the STAs and the AP.

In the prior art, both an authentication response frame and an association response frame are separately sent to each STA, thereby occupying massive downlink resources.

To resolve the foregoing problem, in the embodiments of the present invention, software and corresponding hardware that are running in the AP and the STA in the prior art are improved, so that authentication response frames or association response frames for multiple STAs may be sent in one frame, thereby saving downlink resources. In addition, further, in a scenario of intensive users, an average delay for establishing a connection between a STA and an AP may be shortened.

Figure 3:
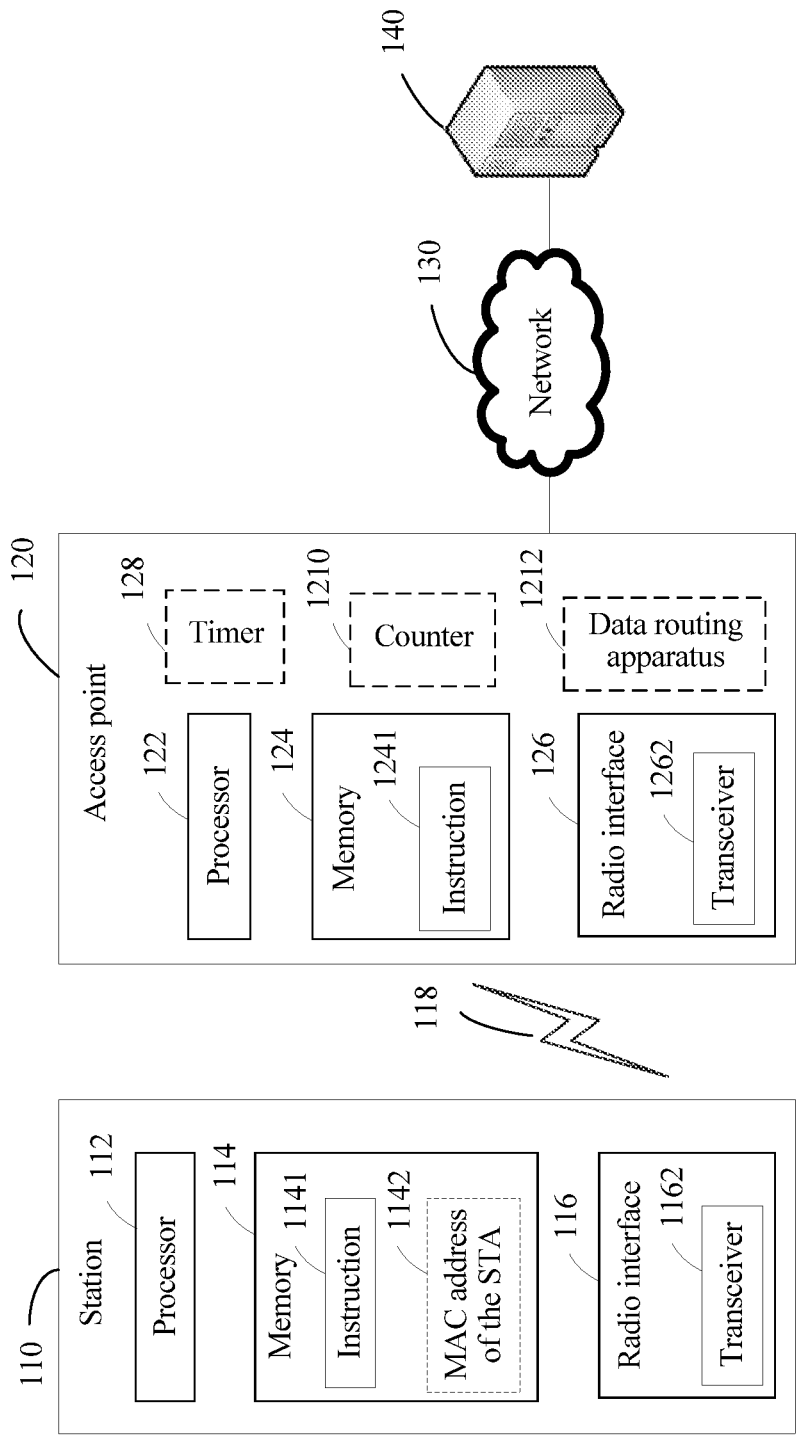
FIG. 3 is a schematic structural diagram of a WiFi system according to an embodiment of the present invention.

In the embodiments of the present invention, there may be multiple STAs that establish connections to an AP. For ease of description, a connection relationship between only one STA of the multiple STAs and the AP is schematically drawn in FIG. 3. In FIG. 3, a STA (no) is connected to an AP (120) by using a radio link (118). The AP (120) is connected to a network device (140) by using a network (130). The network (130) may be a wired network or a wireless network. The STA (no) may establish a connection to the AP (120) by using the radio link (118). For example, the STA (no) may send an authentication request or an association request to the AP (120) by using the radio link (118), and receive, by using the radio link, an acknowledgment message or a response message returned by the AP (120). Data transmission may also be performed between the STA (no) and the network device (140) by using the AP (120).

Referring to FIG. 3, the AP (120) includes a processor (122), a memory (124), and a radio interface (126). The memory (124) is configured to store instructions. The radio interface (126) is configured to connect the AP and N STAs (N is a natural number greater than or equal to 1). The processor (122) is coupled to the memory (124), and is configured to read the instructions in the memory (124) and execute, according to the instructions (1141) in the memory (122), a part or all of steps that are executed by the AP in a method embodiment of the present invention, so as to establish a communication connection between the AP (120) and the STA. For example, the processor (122) may receive, by using the radio interface (126), request frames sent by the N STAs, and send a response frame to M STAs of the N STAs by using the radio interface (126). In addition, the processor (122) may further receive, by using the radio interface (126), other information sent by the STA (110), and return various information to the STA (110) by using the radio interface (126). The processor (122) is coupled to the memory (124), and is configured to read the instructions in the memory and achieve, according to the instructions (1241), a method for establishing a communication connection between the STA (110) and the AP (120) in this embodiment of the present invention. In an example, a function of the foregoing radio interface (126) may be implemented by using a radio transceiver (1262). To perform data communication between the STA (110) and the network device (140), the AP (120) may further include a data routing apparatus (1212). The AP (120) sends data of the STA (110) to the network device (140) by using the data routing apparatus (1212), or sends data of the network device (140) to the STA (110).

The STA (110) may include a processor (112), a memory (114), and a radio interface (116). The memory 114 is configured to store instructions. The radio interface (116) is configured to connect the STA (110) and the AP (120). When the STA (110) needs to establish a connection to the AP (120), the processor (112) may send a request frame to the AP (120) by using the radio interface (116), and receive, by using the radio interface (116), a response frame sent by the AP (120). In addition, the processor (112) may further send other information to the AP (120) by using the radio interface (116), and receive, by using the radio interface (116), various information returned by AP (120). The foregoing processor (112) is coupled to the memory (114), and is configured to read the instructions (1141) in the memory (114) and execute, according to the instructions (1141), steps that are executed by the STA (110) in a method embodiment of the present invention, so as to establish a communication connection between the STA (110) and the AP (120). In an example, a function of the foregoing radio interface (116) may be implemented by using a radio transceiver (1162).

The foregoing request frame may be an authentication request frame and the response frame is an authentication response frame, or the foregoing request frame is an association request frame and the response frame is an association response frame. The foregoing authentication request frame and authentication response frame are merely two different names, and are used to distinguish a used authentication frame from an authentication frame that is not used. In a practical application, both of the two frames may be referred to as authentication frames, and a network entity that receives the authentication frames may make a distinction by using different sequence numbers carried in the authentication frames.

Figures 4, 5:
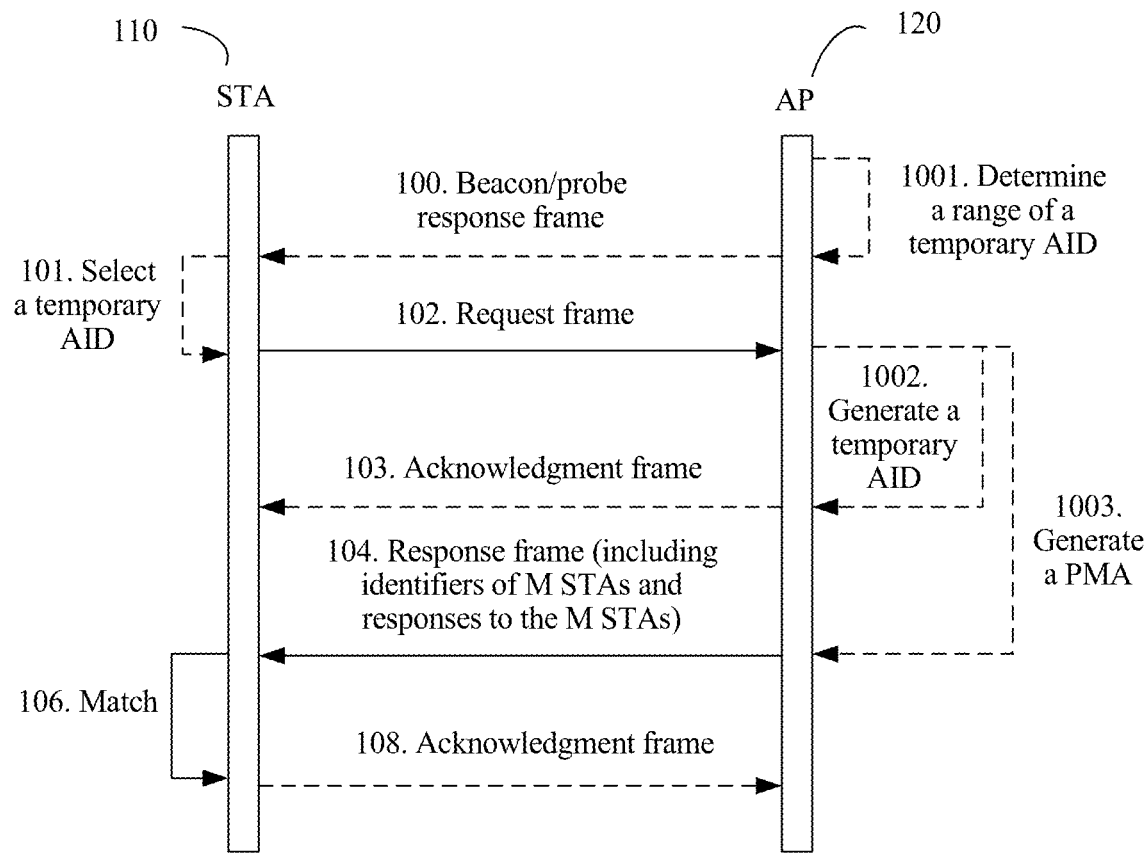
FIG. 4 is a schematic flowchart of a method for establishing a connection between a STA and an AP according to an embodiment of the present invention.
FIG. 5 is a schematic structural diagram of an authentication request frame according to an embodiment of the present invention.

The following uses a specific example to describe the method for establishing a communication connection between the STA (no) and the AP (120). Steps that are executed by the STA (no) in the following method may be implemented by the processor (112) in the STA (no) by executing the instructions stored in the memory (114). Steps that are executed by the AP (120) may be implemented by the processor (122) in the AP (120) by executing the instructions stored in the memory (124). Referring to FIG. 4, in this embodiment of the present invention, the method for establishing a communication connection between the STA (no) and the AP (120) is as follows.

102. The STA (no) sends a request frame to the AP (120).

When data transmission needs to be performed between the STA (no) and the AP (120), the STA (no) sends the request frame to the AP (120), so as to establish a connection between the STA (no) and the AP (120). N STAs may send request frames to the AP (120), and the STA (no) is one of the N STAs.

104. The STA (110) receives a response frame sent by the AP (120). The response frame includes identifiers of M STAs and M responses to the M STAs, and the STA (110) is one of the M STAs. Each of the identifiers of the M STAs corresponds to one of the M responses, and the M identifiers and the M responses are used to instruct the M STAs to receive respective responses from the response frame sent by the AP (120).

In the present invention, N STAs may send request frames to the AP (120), and N is a natural number greater than or equal to 1. However, some STAs of the N STAs may fail to meet a condition, for example, do not support the response frame sent by the AP to be received in a downlink OFDMA manner or a downlink multi-user multiple-input multiple-output (MU MIMO) manner or a downlink multicast frame manner, or have a conflict between selected identifiers. Consequently, the AP cannot send the response frame to these STAs. Therefore, although N authentication request frames are received by the AP, acknowledgment frames that are sent may include acknowledgments only to M STAs, and M is a natural number less than or equal to N. A person skilled in the art may understand that when all the STAs of the N STAs meet the condition, M=N.

In a specific implementation manner, to enable the M responses to be sent in one response frame, 2≤M≤N, and N≥2.

Optionally, when the M responses need to be sent together with data frames or management frames of J other STAs than the N STAs, the responses further include identifiers of the J STAs and the data frames or the management frames of the J STAs. In this case, a value of M may be 1 or a number greater than 1, that is, 1≤M≤N, and N≥1.

106. The STA (110) matches an identifier obtained by the STA (110) against the identifiers of the M STAs, so as to obtain a response with respect to the STA (110) from the M responses.

The foregoing identifier obtained by the STA (110) may be an identifier received by the STA (110) from the AP or may be an identifier stored by the STA.

Optionally, the foregoing response frame may further include data frames or management frames of J other STAs. When each of the J STAs receives the response frame, a corresponding data frame or management frame may be obtained from the response frame according to an identifier of the STA.

In step 102, when the STA (110) needs to be authenticated by the AP (120), the request frame sent by the STA (110) to the AP (120) is an authentication request frame. The STA (110) may send the authentication request frame in a prior-art manner. For example, the authentication request frame may be sent on a channel which is contended for in a CSMA/CA (carrier sense multiple access with collision avoidance) manner, or the STA (110) may be inquired by the AP to send the authentication request frame, or the authentication request frame may be directly sent by the STA (110) in a specific window, or the authentication request frame may be sent on a channel which is obtained by the STA (110) in a limited contention manner. This embodiment of the present invention sets no limitation on the manner for sending the authentication request frame by the STA (110). It should be understood that in step 102, when the STA (110) needs to be associated with the AP (120), the request frame sent by the STA (110) to the AP (120) is an association request frame.

Figure 6:
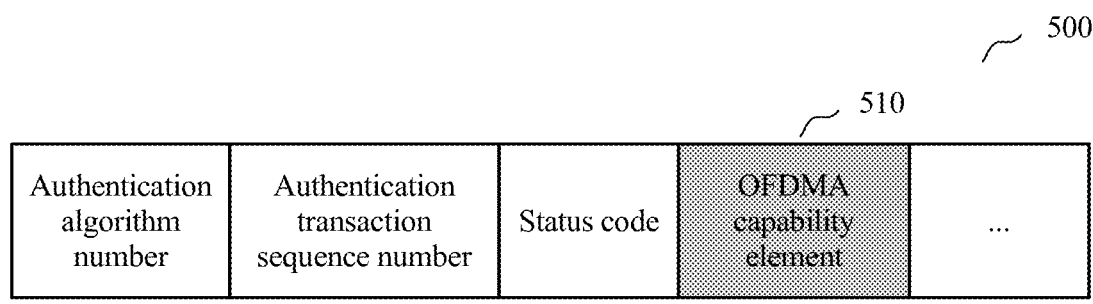
FIG. 6 is a schematic structural diagram of an authentication request frame according to another embodiment of the present invention.

Because an authentication process is similar to an association process, for brevity, only the authentication process is used as an example to make a description in the following. With the authentication process as an example, for a structure of an authentication request frame (500) in the prior art, refer to FIG. 5. In an embodiment of the present invention, the STA (110) may notify the AP (120) in advance by using the authentication request frame that the STA (110) supports a downlink OFDMA manner or a downlink MU MIMO manner or a downlink multicast frame manner that is to be used to receive an authentication response frame, that is, supports the AP (120) in delivering responses with respect to different STAs in one authentication response frame. Therefore, referring to FIG. 6, it is assumed that the STA (110) supports the OFDMA manner that is to be used to receive the authentication response frame. The foregoing authentication request frame (500) may further include an OFDMA capability element (510) configured to indicate that the STA (110) supports the OFDMA manner that is to be used to receive the authentication response frame. The OFDMA capability element (510) may be a newly-added information element in the authentication request frame (500), or may be directly carried in a Status Code information field that is unused in the authentication request frame (500). When the request frame is an association request frame, a new OFDMA capability element may be added to the association request frame.

Figure 7:
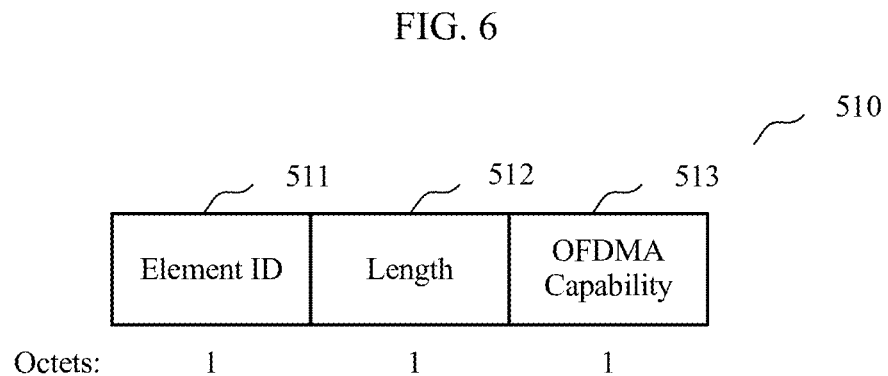
FIG. 7 is a schematic structural diagram of an OFDMA capability information element according to an embodiment of the present invention.

In a specific example, a structure of the OFDMA capability information element (510) may be shown in FIG. 7. The OFDMA capability information element (510) includes an information element identifier (Element ID) (511), an information element length (Length) (512), and OFDMA capability information (OFDMA Capability) (513). The Element ID (511), the Length (512), and the OFDMA Capability (513) each may occupy 1 byte.

Certainly, in another example, the STA (110) may add an information element to the authentication request frame to notify the AP (120) that the STA (110) supports a downlink MU MIMO manner or a downlink multicast frame manner that is to be used to receive the authentication response frame sent by the AP (120).

In this embodiment of the present invention, the N STAs may send the request frames to the AP, and N may be determined in the following two manners.

(1) N may refer to a quantity of STAs that send request frames to the AP in a preset time range. Specifically, the AP (120) may set a time range, and the AP (120) receives request frames sent by STAs in the time range. N refers to a quantity of STAs that send request frames to the AP (120) in the time range.

Figure 8:
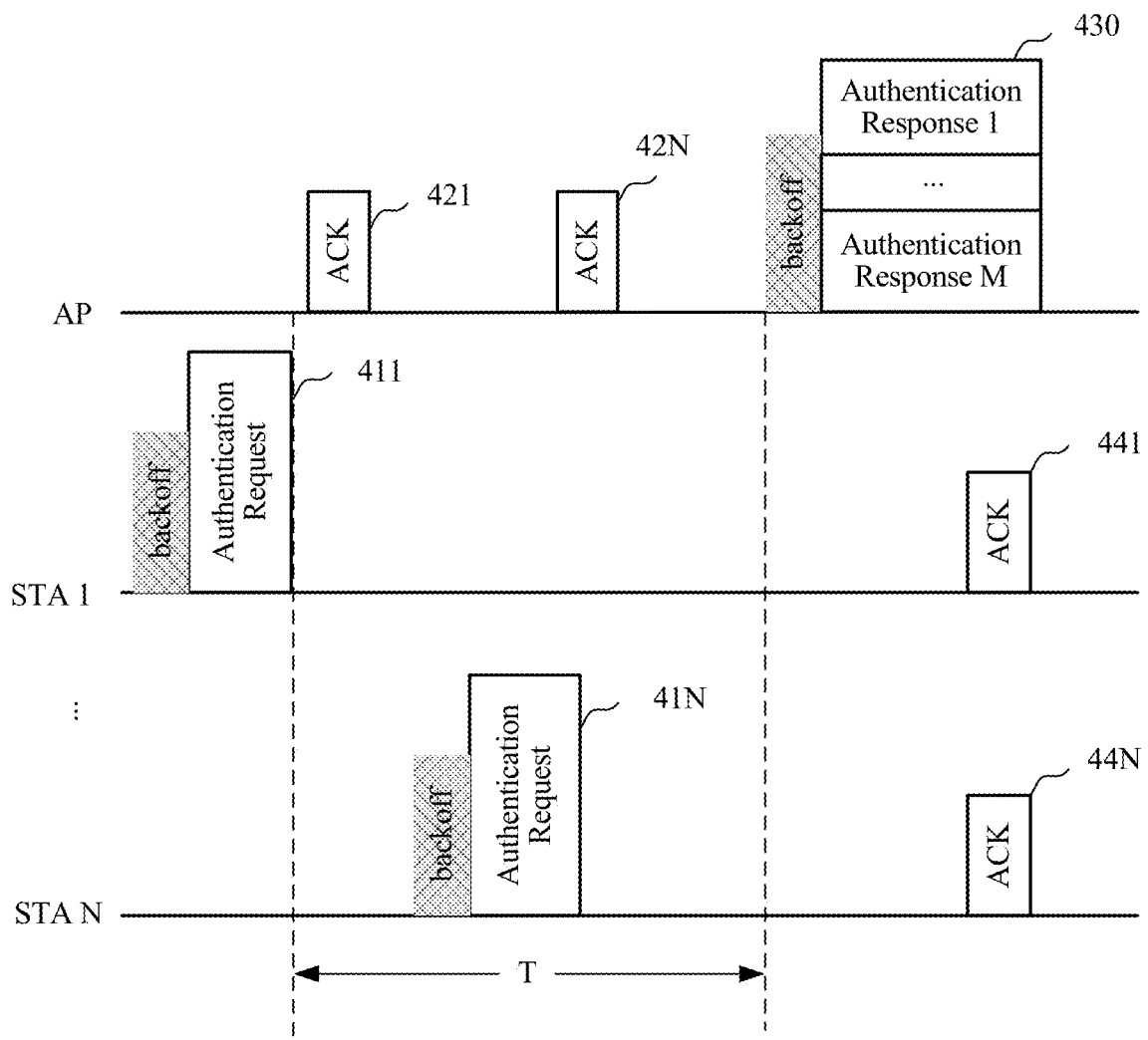
FIG. 8 is another schematic flowchart of signaling for establishing a connection between a STA and an AP according to an embodiment of the present invention.

Referring to FIG. 3, the AP (120) may include a timer (128), and duration of the timer (128) may be set to be the same as a SIFS value. Referring to FIG. 8, with an authentication process as an example, after receiving an authentication request frame (411) sent by a STA for the first time, the AP (120) starts the timer (128). Assuming that the duration of the timer (128) is set to T, when the duration T of the timer (128) is used up, the AP (120) receives authentication request frames (411, . . . , 41N) in total sent by N STAs. In this case, the AP (120) returns one authentication response frame (430) to M STAs of the N STAs. The authentication response frame (430) includes M authentication responses (an authentication response 1, . . . , an authentication response M), and each authentication response corresponds to one STA of the M STAs.

The duration T of the foregoing timer (126) may be determined by using the following function:

$$T=f(x)=x-t, \; 0<t<x,$$

where x may be set to a validity period of an authentication request frame, that is, if a STA does not receive an authentication response sent by the AP within the validity period, it indicates that the authentication fails, and the STA needs to re-initiate authentication, and t is a number greater than 0 and less than x, for example, may be 1 ms, 2 ms, 3 ms, or the like.

(2) N may be determined by the AP (120).

For example, a value of N may be a maximum quantity of users that can be supported by a downlink OFDMA frame or a downlink MU MIMO frame or a downlink multicast frame, or a value of N may be a quantity of connected STAs that is preferably supported by the AP (120). Referring to FIG. 3, the AP (120) may further include a counter (1210). Still using an authentication process as an example, each time the processor (122) of the AP (120) receives an authentication request frame sent by a STA, 1 is added to a value of the counter (1210). When the value of the counter (1210) reaches N, it indicates that a quantity of authentication request frames that are received by the AP reaches N. In this case, the AP (120) sends an authentication response frame to M STAs of the N STAs. The authentication response frame includes M authentication responses, and each authentication response corresponds to one STA of the M STAs.

In another embodiment, to make a STA know that the AP (120) already receives a request frame sent by the STA and allows the STA to execute subsequent steps, for example, allows the STA to be associated with the AP (120) or allows the STA to execute subsequent authentication, the AP (120) may first return an acknowledgment frame to the STA. For example, referring to FIG. 4, after receiving authentication request frames sent by the N STAs, the AP (120) may further execute step 103. In step 103, the AP (120) first returns an acknowledgment (ACK) frame to each STA of M STAs. The ACK frame indicates that the AP (120) already receives request frames sent by the M STAs and allows the M STAs to be associated with the AP (120). In another embodiment, the AP (120) may send only one multi-user ACK frame to the M STAs. M acknowledgments to the M STAs are included in the multi-user ACK frame. To enable each STA to learn of a manner for subsequently sending the acknowledgment frame by the AP, indication information may be included in the foregoing ACK frame or the multi-user ACK frame, and is used to notify each STA that the AP (120) is to send the responses with respect to the M STAs by using the one response frame.

The STA (no) receives an acknowledgment (ACK) frame sent by the AP (120).

Figure 9:
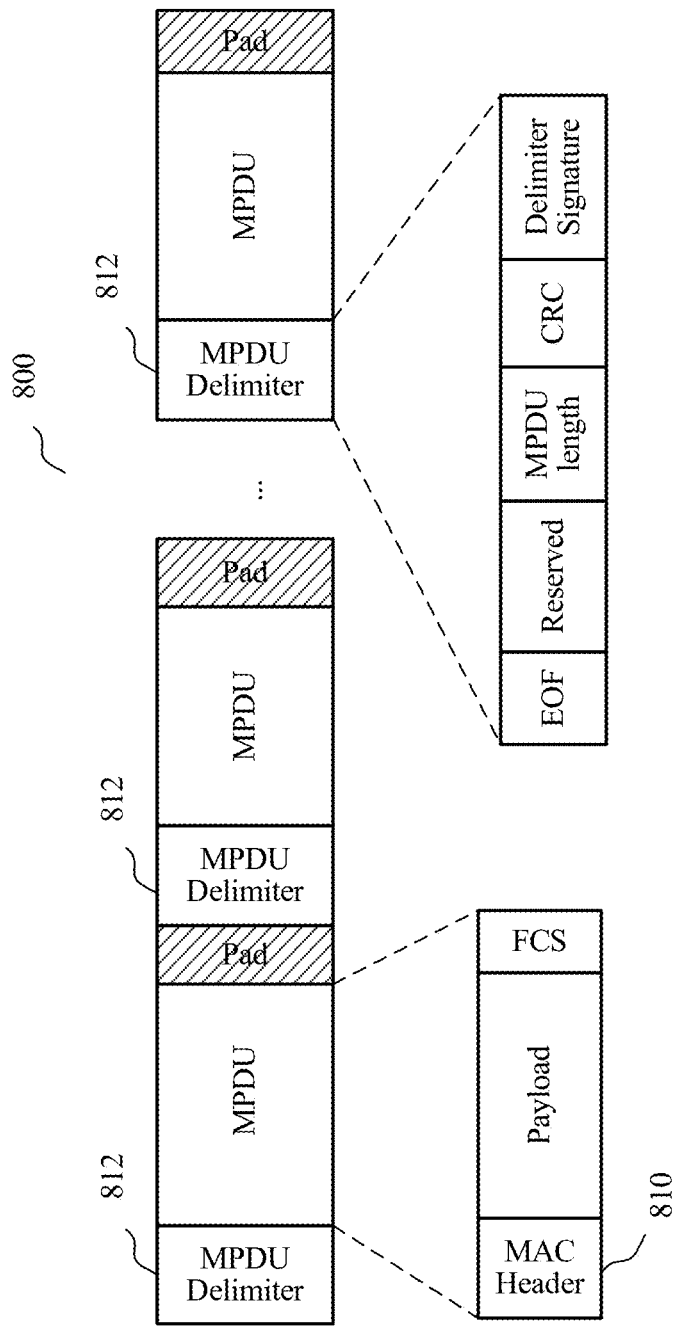
FIG. 9 is a schematic structural diagram of an A-MPDU according to an embodiment of the present invention.

Subsequently, in step 104, the AP (120) contends for a channel and sends a response frame to the STA (110) by using the channel obtained by means of contention. The response frame includes M identifiers of the M STAs and M responses to the M STAs. The response frame may be sent in a downlink OFDMA (DL OFDMA) manner. For example, the AP (120) sends the responses with respect to the M STAs on different sub-bands of the channel obtained by means of contention. Alternatively, the response frame may be sent in a MU MIMO manner. For example, the AP (120) sends the responses with respect to the M STAs on different special flows of the channel obtained by means of contention. Alternatively, the response frame may be sent in a downlink multicast frame manner. For example, the AP (120) sends an A-MPDU (Aggregate MAC protocol data unit) on the channel obtained by means of contention. The A-MPDU includes M MPDUs that are respectively corresponding to the responses with respect to the M STAs. Referring to FIG. 9, an A-MPDU may include multiple MPDUs. In the prior art, all MPDUs in one A-MPDU can be sent only to a same receive node. After receiving an A-MPDU, a STA checks only a receive address of the first MPDU. If the address of the first MPDU does not match an address of the STA, the STA stops the receiving process. Therefore, a further design is required to support a case in which one A-MPDU is used to send responses with respect to different STAs.

In a possible implementation manner, the AP (120) adds one information bit to a frame when sending an A-MPDU, and the information bit is used to indicate that each STA should check receive addresses of all MPDUs in the A-MPDU when receiving the A-MPDU, match an address of the STA against the receive addresses, and receive the A-MPDU if the match succeeds. The information bit may be located in a MAC header (810), or may be located in a reserved bit (Reserved bit) of an MPDU delimiter (812), or may be located in an HE-SIG A of a response frame shown in FIG. 10.

To distinguish the foregoing responses with respect to the M STAs, the response frame sent by the AP may further need to include identifiers of the M STAs, and each of the identifiers of the M STAs corresponds to one of the M responses. The identifiers of the STAs may be obtained by using any one of the following three manners.

(1) The identifiers of the M STAs are generated by the AP according to MAC addresses of the M STAs.

For example, the AP generates a corresponding PMA according to a MAC address of each STA. Each STA uses a same calculation method as the AP to generate a PMA according to a MAC address of the STA.

Alternatively, the AP generates, according to a MAC address of each STA, a PMA address that is used as an identifier of the STA. The AP adds a PMA of each STA to an ACK frame sent to the STA.

There are multiple methods for calculating a PMA. In a specific example, a PMA address may be generated by means of calculation according to multiple bits of a MAC address of a STA. When a PMA address needs to be used together with an AID (Association ID), a length of the PMA address preferably does not exceed a length (14 bits) of the AID and not overlap with a range (1-2007) of the AID. For example, assuming that there are N LSB (least significant bit) bits in total in a MAC address of a STA, a PMA may be generated according to the following formula:

$$PMA=(dec(MA[a:b])+dec(MA[c:d]\oplus MA[e:f])\times 2^g) \mod(2^h-i)+j,$$

where a, b, c, d, e, f, g, h, i, and j are natural numbers, MA[m:n] refers to an $m^{th}$ LSB bit to an $n^{th}$ LSB bit of the MAC address of the STA, and dec refers to a decimal number. An AID range may not be involved in the generation solution, and relatively more bits of the MAC address are used, better avoiding an overlap of a PMA address.

Figure 10:
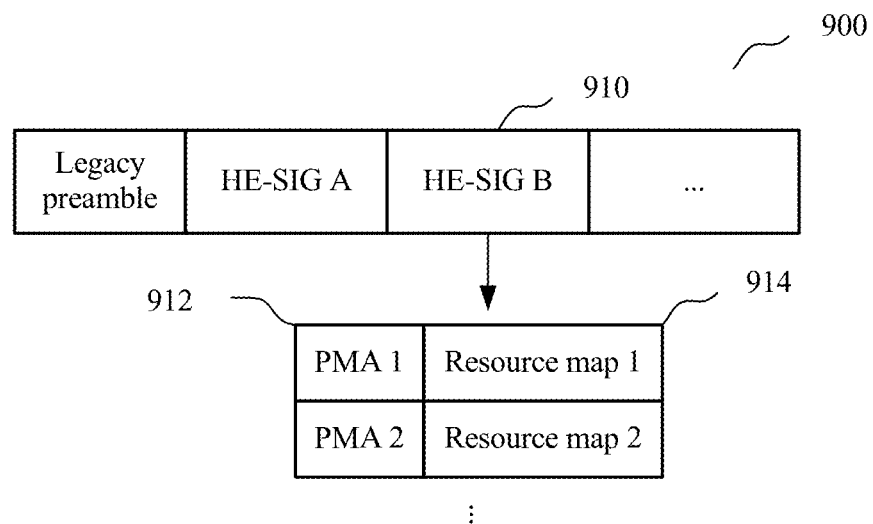
FIG. 10 is a schematic structural diagram of a response frame according to an embodiment of the present invention.

When the identifier of the STA that is carried in the response frame sent by the AP to the STA is a PMA, referring to FIG. 10, the PMA may be put in an HE-SIG B information element (910) of the response frame (900). In addition, the HE-SIG B information element (910) may further include resource mapping that is allocated to each STA, and the resource mapping is used to notify a STA of a resource location for receiving a response with respect to the STA.

(2) The identifier of the STA may be a temporary AID, and the temporary AID is a sequence randomly selected by each STA from a preset sequence range, and is carried in the request frame and sent to the AP.

For example, referring to FIG. 4, before step 102, step 101 may further be executed. In step 101, a STA may randomly select, from a preset sequence range (for example, [2008, 4096]), a value as a temporary AID of the STA, add the temporary AID to a request frame, and send the request frame to the AP. After receiving a request frame sent by each STA, the AP obtains an AID of each STA. If multiple STAs select a same temporary AID, the AP may select to use a traditional method to reply. For example, the AP sends a separate response frame to each of the STAs that have a same temporary AID.

Figure 11:
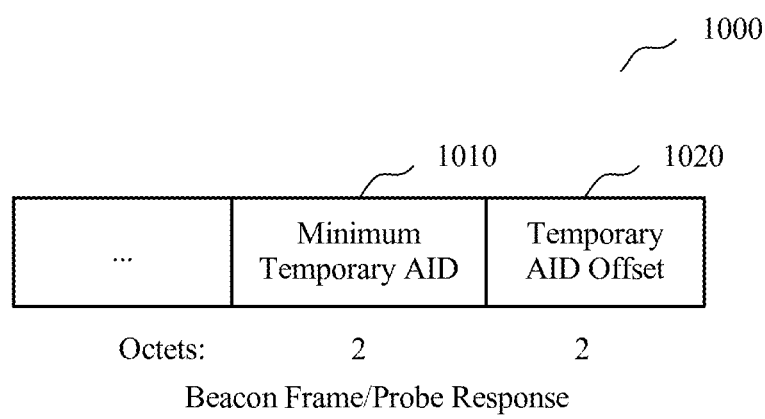
FIG. 11 is a schematic structural diagram of a beacon/probe response frame according to an embodiment of the present invention.

The foregoing preset sequence range may be determined by the AP and sent to each STA. For example, referring to FIG. 4, before step 101, step 100 may further be included, that is, the AP (120) sends a beacon/probe response frame to the STA (no), and the beacon/probe response frame includes the foregoing preset sequence range. Referring to FIG. 11, the beacon/probe response frame (1000) sent by the AP to the STA may include two information elements: a Minimum Temporary AID (1010) and a Temporary AID offset (1020). The Minimum Temporary AID (1010) refers to a minimum temporary AID that can be selected by the STA, and the Temporary AID offset (1020) refers to a maximum offset that is relative to the minimum temporary AID and that can be selected by the STA. The Minimum Temporary AID (1010) and the Temporary AID offset (1020) each may occupy two bytes (byte).

(3) The identifier of the STA may be a temporary AID, and the temporary AID is generated by the AP and is sent to the STA by using the acknowledgment frame before the response frame is sent.

When a STA selects a same temporary AID as other STAs or the STA does not add a temporary AID to a request frame, the AP may generate a temporary AID in the manner (3) and send the temporary AID to the STA.

Figure 12:
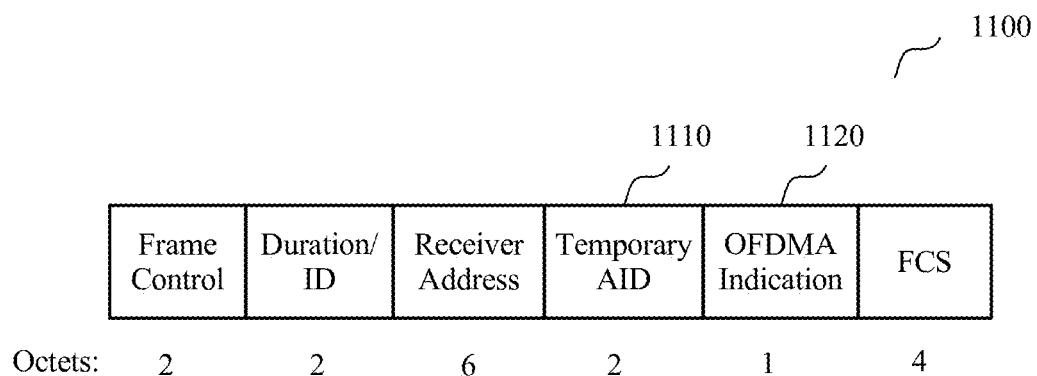
FIG. 12 is a schematic structural diagram of an ACK frame according to an embodiment of the present invention.

For example, referring to FIG. 4, after the AP (120) receives the request frame sent by the STA, step 1002 may further be executed, that is, the AP (120) randomly selects, from a preset sequence range, a sequence as a temporary AID, and sends the temporary AID to the STA by using an ACK frame in step 103. After receiving the ACK frame, the STA obtains a temporary AID of the STA from the ACK frame and stores the temporary AID in the memory (114). Subsequently, after receiving the response frame sent by the AP, the STA may obtain the temporary AID from the memory (114) and compare the temporary AID with temporary AIDs in the response frame, so as to obtain a response with respect to the STA from the response frame. Referring to FIG. 12, the AP may newly add an information element Temporary AID (1110) to an ACK frame (1100), and the Temporary AID (1110) is used to represent a temporary AID. In addition, the AP may further newly add another information element OFDMA Indication (1120) to the ACK frame (1100), and the OFDMA Indication (1120) is used to notify the STA that the AP is to deliver a response frame in an OFDMA manner.

Certainly, the AP may notify the STA, by using the ACK frame (1100), that the AP is to send the response frame in another manner such as a downlink MU MIMO manner or a downlink multicast frame manner.

Figure 13:
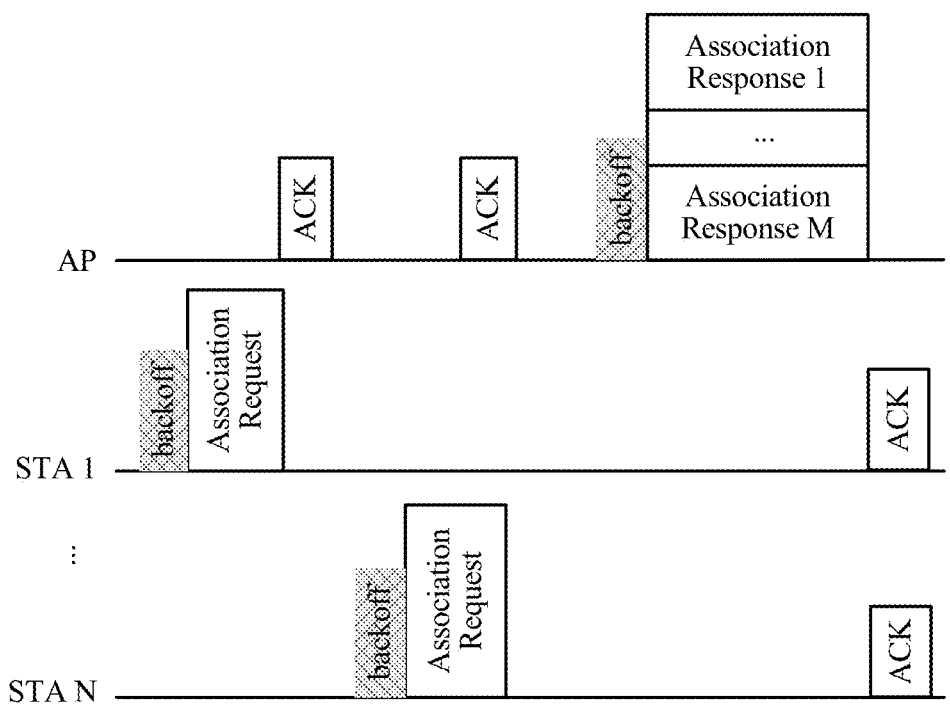
FIG. 13 is a schematic flowchart of signaling for establishing an association between a STA and an AP according to an embodiment of the present invention.

A lot of the foregoing embodiments use the authentication process as an example to make a description. FIG. 13 shows an association process between a STA and an AP in this embodiment of the present invention. Because the association process between the STA and the AP is similar to the foregoing authentication process, details are not described herein. A person skilled in the art may understand that when the STA is being associated with the AP, the STA sends an association request frame to the AP, and the AP returns an association response frame to the STA.

Figure 14:
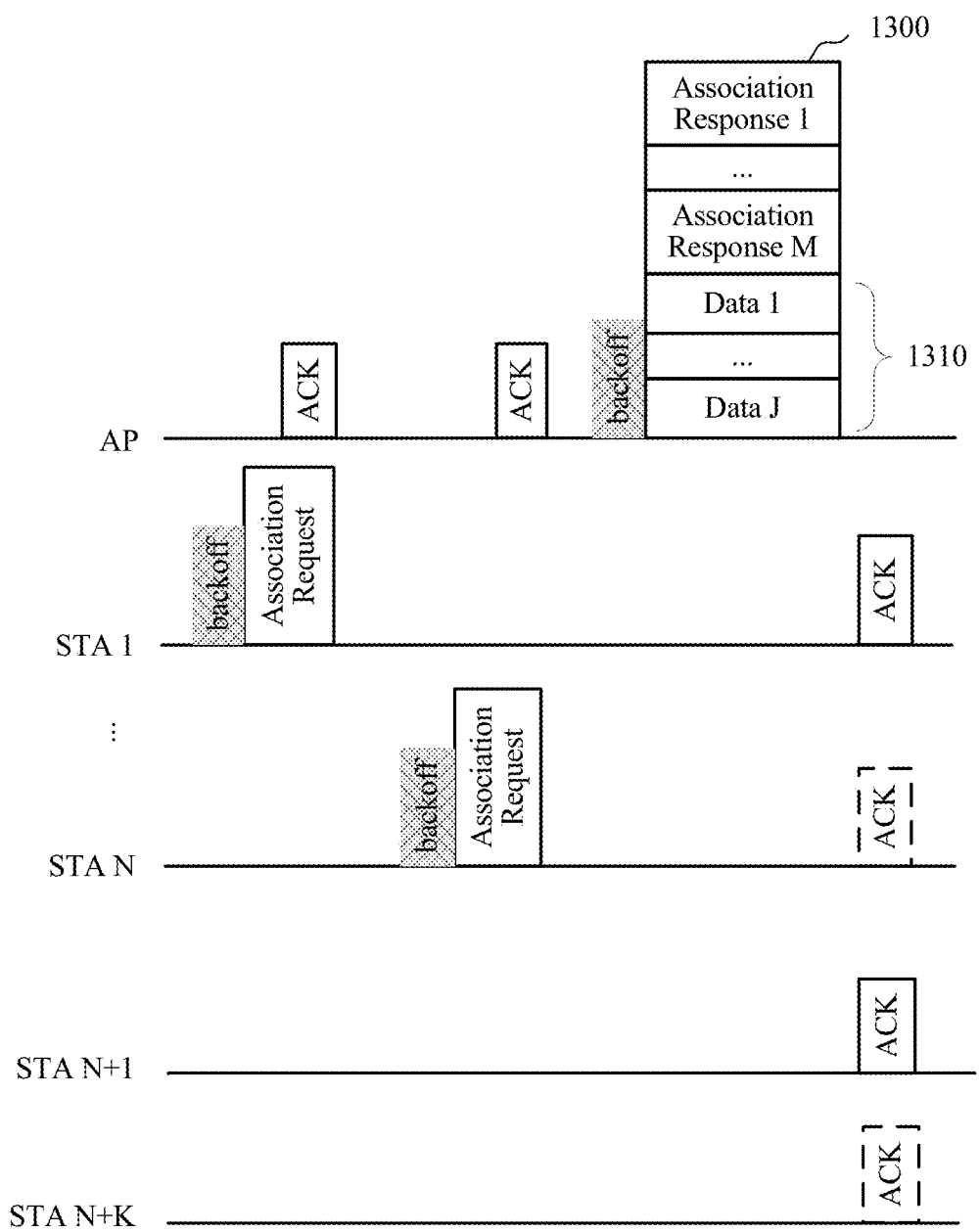
FIG. 14 is another schematic flowchart of signaling for establishing a connection between a STA and an AP according to an embodiment of the present invention.

In another embodiment, in addition to sending responses with respect to multiple STAs by using a response frame, the AP may further send data frames or management frames of other STAs than the multiple STAs by using the response frame. Referring to FIG. 14, it is assumed that there are N+K STAs. The first STA to an $N^{th}$ STA (STA1, . . . , STAN) are to establish or are establishing connections to an AP. Other K STAs (STA N+1, . . . , STA N+K) already establish connections to the AP, and are waiting to receive data frames or management frames sent by the AP to the STAs. K is a natural number. It is assumed that after receiving request frames sent by the first N STAs, the AP needs to send responses to M STAs of the N STAs, and the AP further needs to send data frames or management frames to J STAs of the foregoing K STAs. J is a natural number less than or equal to K. In this case, to further save downlink resources, the responses with respect to the M STAs and the data frames or the management frames of the J STAs may be put by the AP in one response frame and sent, and the J STAs support a downlink OFDMA manner or a downlink MU MIMO manner or a downlink multicast frame manner. That is, referring to FIG. 14, a response frame (1300) sent by the AP to the M STAs further includes data (1310) of the J other STAs. Because the foregoing J STAs already establish connections with the AP and obtain AIDs during a process of establishing the connections, to enable each of the J STAs to identify a data frame or a management frame with respect to the STA, the response frame may further include identifiers (for example, an AID or a temporary AID) that are corresponding to the J STAs and are used to instruct the J STAs to receive respective data frames or management frames from the response frame. As described in the foregoing embodiments, the responses with respect to the M STAs may be distinguished according to the identifiers of the STAs. For a STA that does not support a downlink OFDMA manner or a downlink MU MIMO manner or a downlink multicast frame manner, the AP may still use an existing manner to send a response frame or a data frame or a management frame.

Further, if there is a conflict between identifiers (for example, a PMA or a temporary AID) used by the M STAs and AIDs used by the foregoing J STAs, to enable the STA to distinguish identifiers that are identified by using AIDs from identifiers that are identified in another manner (for example, by using a PMA or a temporary AID), the response frame sent by the AP to the STA may further include an indication bit that is used to indicate whether an AID is used. Certainly, if there is no conflict at all between the identifiers used by the first N STAs and an AID, the indication bit may not be used.

In the foregoing embodiments, each STA sends a separate request frame to the AP. To save an uplink resource, in another embodiment, the AP may further send trigger signaling to the foregoing M STAs, so as to trigger the M STAs to subsequently send request frames (for example, an authentication request frame or an association request frame) in an uplink OFDMA (UL OFDMA) manner or in a MU MIMO manner, that is, the M STAs may send request frames to the AP on different sub-bands or different spatial flows of a same channel.

Figure 15:
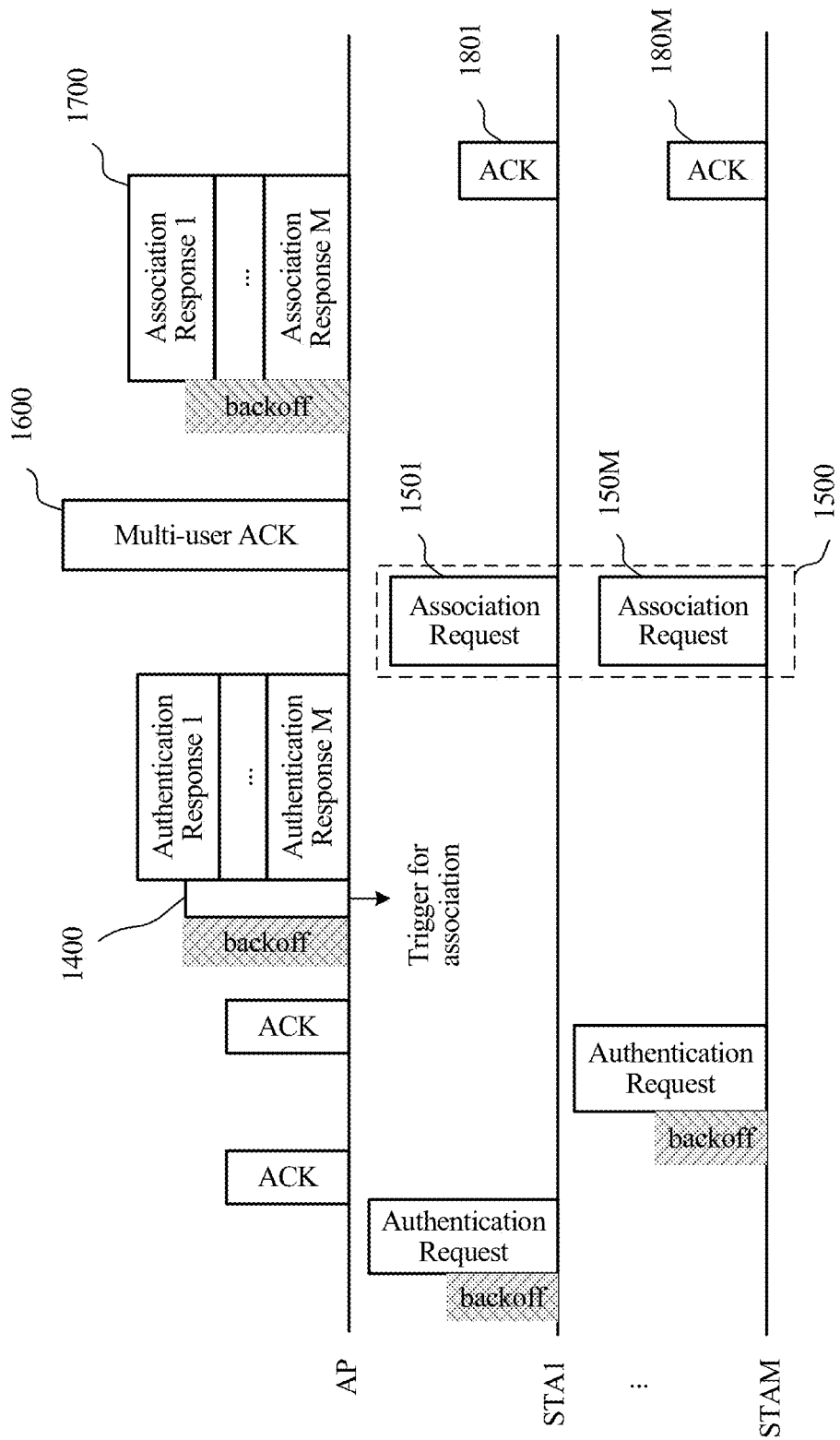
FIG. 15 is another schematic flowchart of signaling for establishing a connection between a STA and an AP according to an embodiment of the present invention.

Referring to FIG. 15, assuming that the AP (120) receives authentication request frames sent by N STAs, to prevent these STAs from contending for respective channels and wasting uplink resources, the AP (120) may send trigger signaling (1400) to M STAs that support an uplink OFDMA manner or a MU MIMO manner of the N STAs, and the trigger signaling (1400) is used to instruct the M STAs (1501, . . . , 150M) to subsequently send the request frames of the M STAs on M sub-bands or M spatial flows of a same uplink channel (1500). The manner for sending the request frames may be an uplink OFDMA manner or a MU MIMO manner. In FIG. 15, the association request frame is used as an example to make a description. A person skilled in the art may understand that when one time of authentication between a STA and an AP is complete and further authentication is required, the request frames may be authentication request frames.

Before sending the response frames to the foregoing M STAs, the AP (120) may first send ACK frames to the M STAs, or send a multi-user ACK frame (1600) to the M STAs. Afterward, the AP (120) sends the response frame to the M STAs.

After receiving the response frame sent by the AP, the foregoing M STAs send an association request frame at a SIFS interval, that is, the M STAs send M association request frames (1501, . . . , 150M) of the M STAs on M sub-bands or M spatial flows of a same uplink channel (1400).

Figure 16:
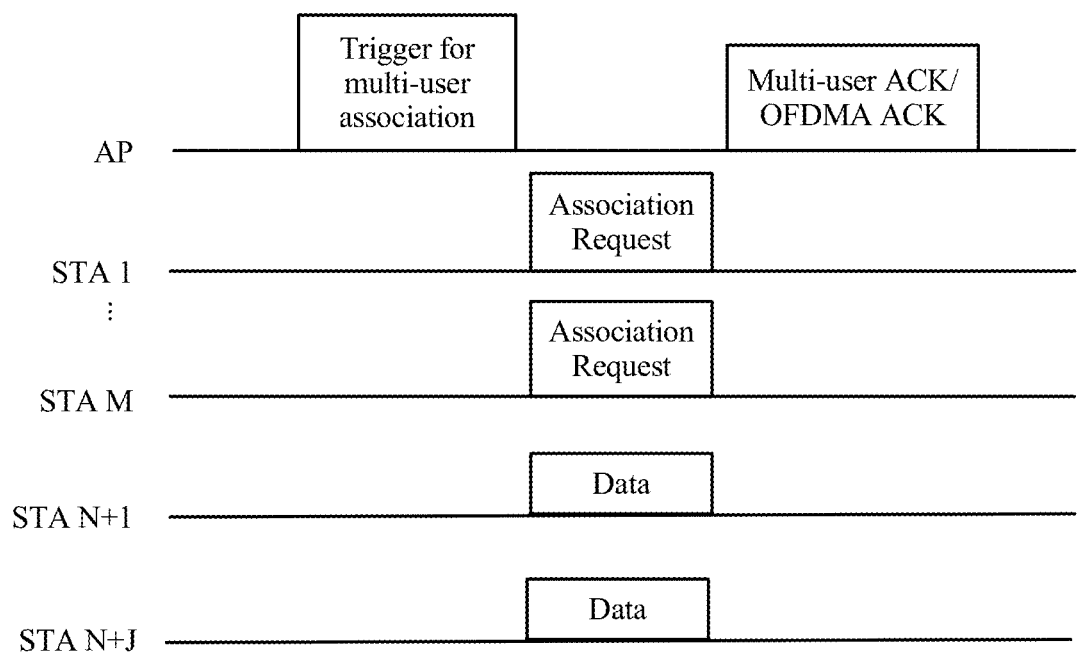
FIG. 16 is another schematic flowchart of signaling for establishing a connection between a STA and an AP according to an embodiment of the present invention.

In another embodiment, if K other STAs (STA N+1, . . . , STA N+K) already establish connections to the AP, and are waiting to receive data frames and management frames sent by the AP to the STAs, and J STAs of the K STAs support an OFDMA manner or a MU MIMO manner, further, the trigger signaling (1400) may further be used to instruct the J other STAs to send data frames, scheduling request frames, management frames, or status information of buffers of the J STAs in a joint manner. That is, referring to FIG. 16, the J STAs may send the data frames, the scheduling request frames, the management frames, or the status information of buffers of the J STAs on J other sub-bands or J other spatial flows of a same uplink channel (1500).

The foregoing trigger signaling (1400) may be a separate trigger frame, or may be located in the response frame, for example, carried in the HE-SIG B information element (910) of the authentication response frame (900).

Figure 17:
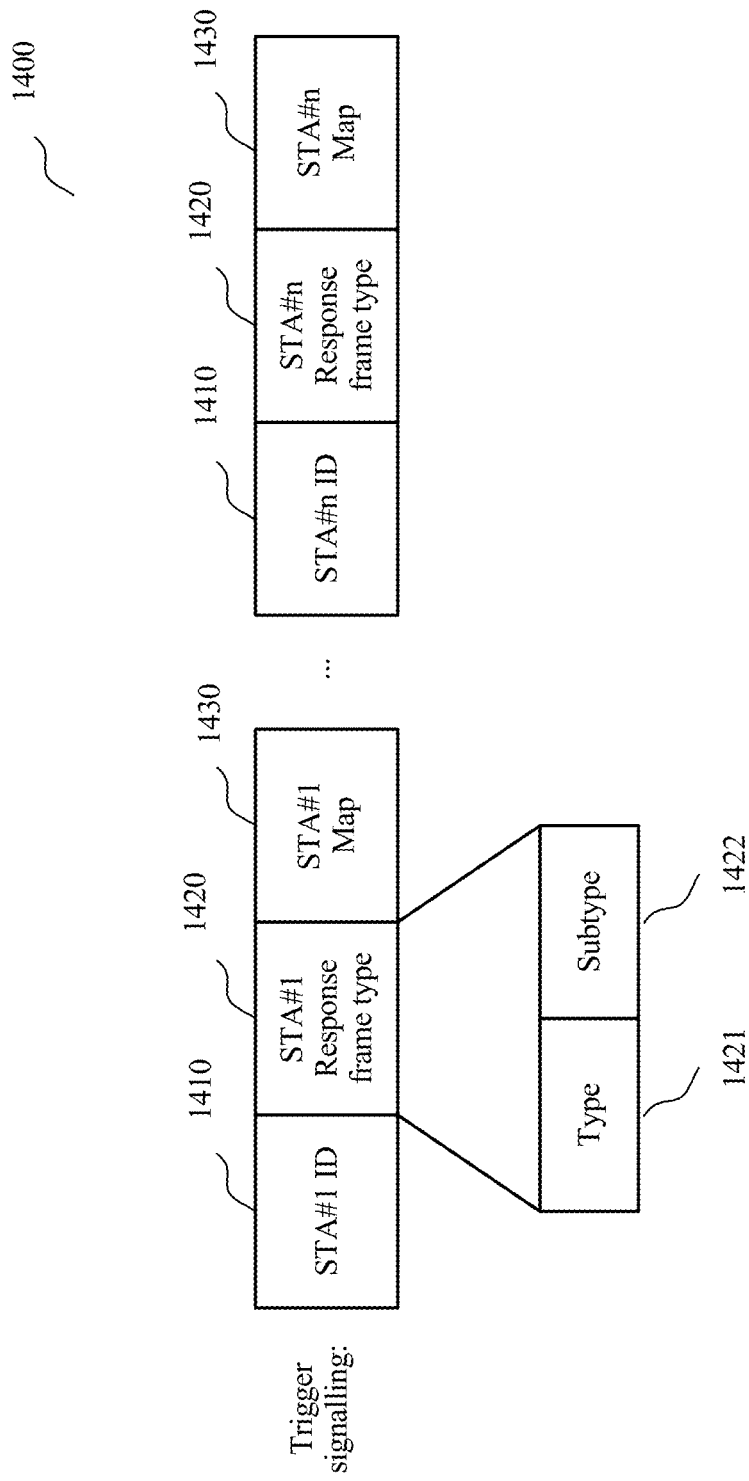
FIG. 17 is a schematic structural diagram of a trigger frame according to an embodiment of the present invention.

A structure of the trigger signaling (1400) may be shown in FIG. 17, and the trigger signaling (1400) includes an identifier (1410) (for example, an AID, a partial AID, a PMA, or a temporary AID) of a triggered STA, a type (1420) of a response frame, and resource mapping (1430) corresponding to the response frame. In a specific example, the type (1420) of the response frame may further include a type (1421) and a subtype (1422), and the type (1421) may be used to indicate whether the response frame is a data frame or a management frame. For example, when the type (1421) shows that the response frame is a management frame, the subtype (1422) may further be used to indicate whether the response frame is an authentication frame, an association frame, or the like. Because the type (1420) of the response frame may be indicated in many prior-art manners, details are not described herein.

FIG. 17 shows three closely adjacent information elements: the identifier (1410) of the STA, the type (1420) of the response frame, and the resource mapping (1430) corresponding to the response frame. A person skilled in the art may understand that in a practical application, the three information elements may be separately set, provided that the trigger signaling includes the three information elements.

After receiving the trigger signaling (1400), the foregoing M STAs and J STAs may send association requests of the M STAs and data frames, scheduling request frames, management frames, or status information of buffers of the J STAs on a same channel.

After receiving the association requests and data sent by the M STAs and the J STAs on the same channel, the AP (120) may return an OFDMA ACK or a multi-user ACK. The OFDMA ACK or the multi-user ACK includes ACKs to the M STAs and ACKs to the J STAs.

In another embodiment, after receiving the association requests sent by the M STAs on the same channel, the AP (120) may not return the foregoing multi-user ACK, but directly execute the subsequent process, for example, directly return an association response (1700) or directly send data frames or management frames.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, components and steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and components, reference may be made to a corresponding process in the foregoing method embodiments, and details are not described herein again.

In addition, the foregoing processor may be implemented in a form of hardware, or may be implemented in a form of a software functional unit. Specifically, the processor may be implemented in a software plus necessary general hardware manner. General hardware includes a universal integrated circuit, a general CPU (Central Processing Unit), a general digital signal processor (DSP), a field programmable gate array (FPGA), a programmable logic device (PLD), a general memory, a general component, and the like. Certainly, the processor may also be implemented by using special-purpose hardware including an application-specific integrated circuit (ASIC), a special-purpose CPU, a special-purpose memory, a special-purpose component, and the like.

The technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Software and instructions may also be transmitted by using a transmission medium. For example, if software is transmitted from a website, a server or another remote source by using a coaxial cable, an optical fiber cable, a twisted pair, a digital subscriber line (DSL), or a wireless technology (such as infrared ray, radio and microwave), the coaxial cable, the optical fiber cable, the twisted pair, the DSL, or the wireless technology (such as infrared ray, radio and microwave) is included in a definition of the transmission medium.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An access point (AP), comprising:
  a processor;
  a non-transitory memory; and
  a radio interface;
  wherein the memory is configured to store instructions;
  wherein the radio interface is configured to connect the AP and N stations (STAs), wherein N is a natural number greater than or equal to 2;
  wherein the processor is coupled to the memory, and is configured to read and execute the instructions in the memory to:
    receive, using the radio interface, N request frames sent by the N STAs; and
    contend, in response to receiving an Nth request frame, for a channel and send, using the radio interface, a single response frame to M STAs of the N STAs on the channel after successful contention, wherein N is selected by the AP according to at least one of expiration of a timer started after receiving a first request frame of the N request frames or a maximum quantity of users that can be supported by a downlink frame, wherein the response frame comprises identifiers of each of the M STAs and further comprises M responses to the M STAs, wherein each of the identifiers of the M STAs corresponds to one of the M responses and is generated according to a media access control (MAC) address of a respective STA of the M STAs, and the identifiers and the M responses instruct the M STAs to receive respective responses from the response frame sent by the AP, wherein M is a natural number, and 2≤M≤N;
  wherein the N request frames are one of authentication frames or association request frames.

2. The AP according to claim 1, wherein the identifier of the STA is a temporary association identifier (AID); and
  wherein the temporary AID is a sequence randomly selected by each STA from a preset sequence range, and is carried in the request frame and sent to the AP, or wherein the temporary AID is generated by the processor, and is sent to each STA using an acknowledgment frame before the response frame is sent.

3. The AP according to claim 1, wherein the processor is further configured to determine a value of N; and
  wherein the value of N is the maximum quantity of users that can be supported by the downlink frame, and wherein the downlink frame is one of a downlink orthogonal frequency division multiple access (OFDMA) frame, or a downlink multi-user multiple-input multiple-output (MU MIMO) frame, or a downlink multicast frame.

4. The AP according to claim 1, wherein the processor of the AP is further configured to:
  before sending the response frame, send an acknowledgment frame to each STA using the radio interface, wherein the acknowledgment frame comprises indication information, and wherein the indication information notifies each STA that the AP is to send the responses with respect to the N STAs using the one response frame.

5. The AP according to claim 1, wherein the response frame sent by the AP further comprises:
  data frames or management frames of J other STAs; and
  identifiers of the J STAs;
  wherein each STA of the J STAs matches an identifier stored by the STA against the identifiers of the J STAs, so as to receive, from the response frame, a data frame or a management frame with respect to the STA, and wherein J is a natural number greater than or equal to 1.

6. The AP according to claim 1, wherein the processor is further configured to deliver trigger signaling using the radio interface, and the trigger signaling instructs the M STAs to send M other request frames of the M STAs on M sub-bands or M spatial flows of a same uplink channel.

7. The AP according to claim 6, wherein the processor is further configured to: after receiving the N request frames, send a multi-user acknowledgment frame to the M STAs using the radio interface, wherein the multi-user acknowledgment frame comprises acknowledgments to the M STAs.

8. The AP according to claim 6, wherein the trigger signaling further instructs J other STAs to send data frames, scheduling request frames, management frames, or status information of buffers of the J STAs on J other sub-bands or J other spatial flows of the same uplink channel.

9. The AP according to claim 1, wherein each of the identifiers of the M STAs are generated according to:

$$PMA=(dec(MA[a:b])+dec(MA[c:d]\oplus MA[e:f])\times 2^g) \mod(2^h-i)+j;$$

wherein PMA is an identifier of the respective STA, wherein a, b, c, d, e, f, g, h, i, and j are natural numbers, MA[m:n] refers to an $m^{th}$ LSB bit to an $n^{th}$ LSB bit of the MAC address of the respective STA, and wherein dec refers to a decimal number.

10. A station (STA), comprising:
a processor;
a non-transitory memory; and
a radio interface;
wherein the memory is configured to store instructions;
wherein the radio interface) is configured to connect the STA and an access point (AP); and
wherein the processor is coupled to the memory, and is configured to read and execute instructions in the memory to:
send a request frame to the AP using the radio interface, and receive a response frame sent by the AP in response to the AP receiving an Nth request frame of N request frames that includes the request frame, wherein N is a natural number greater than or equal to 2 selected by the AP according to at least one of expiration of a timer started after receiving a first request frame of the N request frames or a maximum quantity of users that can be supported by a downlink frame, wherein the response frame is a single frame and comprises identifiers of each of M STAs, including the STA, and further comprises M responses to the M STAs, and each of the identifiers of M STAs corresponds to one of the M responses and is generated according to a media access control (MAC) address of a respective STA of the M STAs, wherein M is a natural number, and M≥2, and wherein the request frame is one of an authentication frame or an association request frame; and
obtain an identifier of the STA, and match the obtained identifier of the STA against the identifiers of the M STAs in the response frame, so as to obtain a response with respect to the STA from the M responses.

11. The STA according to claim 10, wherein the identifiers of the M STAs are M temporary association identifiers (AIDs); and
wherein the processor is further configured to randomly select, from a preset sequence range, a sequence as a temporary AID, and the temporary AID is carried in the request frame and sent to the AP, or wherein the processor is further configured to receive, using the radio interface before receiving the response frame, an acknowledgment frame sent by the AP, wherein the acknowledgment frame comprises the temporary AID.

12. The STA according to claim 10, wherein a value of N is the maximum quantity of users that can be supported by the downlink frame, and wherein the downlink frame is one of a downlink orthogonal frequency division multiple access (OFDMA) frame, or a downlink MU multi-user multiple-input multiple-output (MIMO) frame, or a downlink multicast frame.

13. The STA according to claim 10, wherein the processor is further configured to:
before receiving the response frame sent by the AP, receive an acknowledgment frame sent by the AP, wherein the acknowledgment frame comprises indication information; and
learn, according to the indication information, that the AP is to send the responses with respect to the M STAs using the response frame.

14. The STA according to claim 10, wherein the response frame further comprises:
data frames or management frames of J other STAs; and
identifiers of the J STAs;
wherein each STA of the J STAs matches an identifier stored by the STA against the identifiers of the J STAs, so as to receive, from the response frame, a data frame or a management frame with respect to the STA.

15. The STA according to claim 10, wherein the processor is further configured to receive trigger signaling sent by the AP using the radio interface, and the trigger signaling instructs the M STAs to send M other request frames of the M STAs on M sub-bands or M spatial flows of a same uplink channel.

16. The STA according to claim 15, wherein the processor is further configured to: after sending the request frame to the AP, receive a multi-user acknowledgment frame sent by the AP, and the multi-user acknowledgment frame comprises acknowledgments to the M STAs.

17. The STA according to claim 15, wherein the trigger signaling further instructs J other STAs to send data frames, scheduling request frames, management frames, or status information of buffers of the J STAs on J other sub-bands or J other spatial flows of the same uplink channel.

18. The STA according to claim 10, wherein each of the identifiers of the M STAs are generated according to:

$$PMA=(dec(MA[a:b])+dec(MA[c:d]\oplus MA[e:f])\times 2^g) \mod(2^h-i)+j;$$

wherein PMA is an identifier of the respective STA, wherein a, b, c, d, e, f, g, h, i, and j are natural numbers, MA[m:n] refers to an $m^{th}$ LSB bit to an $n^{th}$ LSB bit of the MAC address of the respective STA, and wherein dec refers to a decimal number.

19. A method, comprising:
receiving, by an access point (AP), request frames sent by N stations (STAs) to the AP, wherein N is a natural number greater than or equal to 2; and
contending, in response to receiving an Nth request frame, for a channel by the AP after receiving the request frames sent by the N STAs, and sending a single response frame to M STAs of the N STAs on the channel after successful contention, wherein N is selected by the AP according to at least one of expiration of a timer started after receiving a first request frame of the N request frames or a maximum quantity of users that can be supported by a downlink frame, wherein the response frame comprises identifiers of each of the M STAs and further comprises M responses to the M STAs, wherein each of the identifiers of the M STAs corresponds to one of the M responses and is generated according to a media access control (MAC) address of a respective STA of the M STAs, and the identifiers and the M responses instruct the M STAs to receive respective responses from the response frame sent by the AP, wherein M is a natural number, and 2≤M≤N;

wherein the N request frames are one of authentication frames or association request frames.

20. The method according to claim 19, wherein the identifier of the STA is a temporary association identifier (AID), and the temporary AID is a sequence randomly selected by each STA from a preset sequence range, and is carried in the request frame and sent to the AP, or wherein the temporary AID is generated by the AP, and is sent to each STA using an acknowledgment frame before the response frame is sent.

21. The method according to claim 19, wherein a value of N is the maximum quantity of users that can be supported by the downlink frame, and wherein the downlink frame is one of a downlink orthogonal frequency division multiple access (OFDMA) frame, or a downlink multi-user multiple-input multiple-output (MU MIMO) frame, or a downlink multicast frame.

22. The method according to claim 19, wherein before sending the one response frame to the M STAs, the AP sends an acknowledgment frame to each STA, wherein the acknowledgment frame comprises indication information, and the indication information notifies each STA that the AP is to send the responses with respect to the M STAs using the one response frame.

23. The method according to claim 19, wherein the response frame sent by the AP further comprises:
data frames or management frames of J other STAs; and
identifiers of the J STAs;
wherein each STA of the J STAs matches an identifier stored by the STA against the identifiers of the J STAs, so as to receive, from the response frame, a data frame or a management frame with respect to the STA.

24. The method according to claim 19, wherein the AP delivers trigger signaling, and the trigger signaling instructs the M STAs to send M other request frames of the M STAs on M sub-bands or M spatial flows of a same uplink channel.

25. The method according to claim 24, wherein after receiving the M other request frames, the AP sends a multi-user acknowledgment frame to the M STAs, and the multi-user acknowledgment frame comprises acknowledgments to the M STAs.

26. The method according to claim 24, wherein the trigger signaling further instructs J other STAs to send data frames, scheduling request frames, management frames, or status information of buffers of the J STAs on J other sub-bands or J other spatial flows of the same uplink channel.

27. A method, comprising:
sending, by a station (STA), a request frame to an access point (AP); and
receiving, by the STA, a response frame sent by the AP, in response to the AP receiving an Nth request frame of N request frames that includes the request frame, wherein N is a natural number greater than or equal to 2 selected by the AP according to at least one of expiration of a timer started after receiving a first request frame of the N request frames or a maximum quantity of users that can be supported by a downlink frame, wherein the response frame is a single frame and comprises identifiers of each of M STAs, including the STA, and further comprises M responses to the M STAs, wherein each of the identifiers of the M STAs corresponds to one of the M responses and is generated according to a media access control (MAC) address of a respective STA of the M STAs, and M is a natural number greater than or equal to 2, and wherein the request frame is one of an authentication frame or an association request frame; and
matching, by the STA, an identifier stored by the STA against the identifiers of the M STAs, so as to obtain a response with respect to the STA from the M responses.

28. The method according to claim 27, wherein the identifiers of the M STAs are M temporary AIDs, and wherein the temporary AID is a sequence randomly selected by each STA from a preset sequence range, and is carried in the request frame and sent to the AP, or wherein the temporary AID is generated by the AP, and is sent to each STA using an acknowledgment frame before the response frame is sent.

29. The method according to claim 27, wherein a value of N is the maximum quantity of users that can be supported by the downlink frame, and wherein the downlink frame is one of a downlink orthogonal frequency division multiple access (OFDMA) frame, or a downlink multi-user multiple-input multiple-output (MU MIMO) frame, or a downlink multicast frame, or wherein a value of N is a quantity of connected STAs that can be supported by the AP.

30. The method according to claim 27, wherein before receiving the response frame sent by the AP, the STA receives an acknowledgment frame sent by the AP, wherein the acknowledgment frame comprises indication information, and the STA learns, according to the indication information, that the AP is to send the responses with respect to the M STAs using the response frame.

31. The method according to claim 27, wherein the response frame further comprises;
data frames or management frames of J STAs; and
identifiers of the J STAs;
wherein each STA of the J STAs matches an identifier stored by the STA against the identifiers of the J STAs, so as to receive, from the response frame, a data frame or a management frame with respect to the STA.

32. The method according to claim 27, wherein the STA receives trigger signaling sent by the AP, and the trigger signaling instructs the M STAs to send M other request frames of the M STAs on M sub-bands or M spatial flows of a same uplink channel.

33. The method according to claim 32, wherein after sending the request frame to the AP, the STA receives a multi-user acknowledgment frame sent by the AP, and the multi-user acknowledgment frame comprises acknowledgments to the M STAs.

34. The method according to claim 32, wherein the trigger signaling further instructs J other STAs to send data frames, scheduling request frames, management frames, or status information of buffers of the J STAs on J other sub-bands or J other spatial flows of the same uplink channel.

* * * * *